(12) United States Patent
Reece et al.

(10) Patent No.: US 10,741,864 B2
(45) Date of Patent: Aug. 11, 2020

(54) AQUEOUS METHODS FOR FORMING TITANIUM CATECHOLATE COMPLEXES AND ASSOCIATED COMPOSITIONS

(71) Applicant: Lockheed Martin Energy, LLC, Bethesda, MD (US)

(72) Inventors: Steven Reece, Cambridge, MA (US); Emily Grace Nelson, Watertown, MA (US); Matthew Millard, Cambridge, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 471 days.

(21) Appl. No.: 15/473,553

(22) Filed: Mar. 29, 2017

(65) Prior Publication Data

US 2018/0191017 A1 Jul. 5, 2018

Related U.S. Application Data

(60) Provisional application No. 62/441,146, filed on Dec. 30, 2016, provisional application No. 62/441,149, (Continued)

(51) Int. Cl.
  *C07F 7/28* (2006.01)
  *H01M 8/18* (2006.01)
  (Continued)

(52) U.S. Cl.
  CPC ............ *H01M 8/188* (2013.01); *C07F 7/28* (2013.01); *H01M 4/90* (2013.01); *H01M 8/08* (2013.01);
  (Continued)

(58) Field of Classification Search
  None
  See application file for complete search history.

(56) References Cited

U.S. PATENT DOCUMENTS 1,279,295 A 9/1918 Downs
2,353,782 A 7/1944 Neumark
(Continued)

FOREIGN PATENT DOCUMENTS

CN 1284208 A 2/2001
CN 101877412 A 11/2010
(Continued)

OTHER PUBLICATIONS

Davies et al. J. Am. Ceram. Soc., 73 [5] 1429-30 (1990).*
(Continued)

*Primary Examiner* — Clinton A Brooks
(74) *Attorney, Agent, or Firm* — BakerHostetler

(57) ABSTRACT

Titanium catecholate complexes can be desirable active materials for flow batteries and other electrochemical energy storage systems, particularly when incorporated in aqueous electrolyte solutions. It can be desirable to avoid introducing certain organic solvents and/or extraneous salts into aqueous electrolyte solutions. Methods for synthesizing titanium catecholate complexes that can help avoid the unwanted introduction of organic solvents and/or extraneous salts into aqueous electrolyte solutions can include: providing an aqueous solution containing a catechol compound, reacting a titanium reagent with the catechol compound in the aqueous solution to form an intermediate titanium catecholate complex, isolating the intermediate titanium catecholate complex as a solid or slurry, and reacting a ligatable compound with the intermediate titanium catecholate complex in the presence of a base to produce a salt form titanium catecholate complex containing at least one additional ligand.

23 Claims, 3 Drawing Sheets

Related U.S. Application Data filed on Dec. 30, 2016, provisional application No. 62/441,150, filed on Dec. 30, 2016, provisional application No. 62/441,151, filed on Dec. 30, 2016, provisional application No. 62/441,153, filed on Dec. 30, 2016, provisional application No. 62/441,154, filed on Dec. 30, 2016.

(51) Int. Cl.
*H01M 4/90* (2006.01)
*H01M 8/08* (2016.01)

(52) U.S. Cl.
CPC .............. *H01M 2300/0002* (2013.01); *H01M 2300/0014* (2013.01)

(56) References Cited

U.S. PATENT DOCUMENTS

| | | |
|---|---|---|
| 2,415,792 A | 2/1947 | Gravell |
| 3,294,588 A | 12/1966 | Morton |
| 3,425,796 A | 2/1969 | Bauer |
| 3,428,654 A | 2/1969 | Rubinfeld |
| 3,573,984 A | 4/1971 | Shah |
| 3,707,449 A | 12/1972 | Reinhardt et al. |
| 3,772,379 A | 11/1973 | Woodgate |
| 3,876,435 A | 4/1975 | Dollman |
| 3,916,004 A | 10/1975 | Okada et al. |
| 3,919,000 A | 11/1975 | Yarrington |
| 3,920,756 A | 11/1975 | Tahara et al. |
| 3,929,506 A | 12/1975 | Leddy et al. |
| 3,985,517 A | 10/1976 | Johnson |
| 3,985,585 A | 10/1976 | Tuttle et al. |
| 4,046,861 A | 9/1977 | Reinhardt et al. |
| 4,064,324 A | 12/1977 | Eustace |
| 4,069,371 A | 1/1978 | Zito |
| 4,126,529 A | 11/1978 | DeBerry |
| 4,180,623 A | 12/1979 | Adams |
| 4,202,799 A | 5/1980 | Yoshimura et al. |
| 4,233,144 A | 11/1980 | Pace et al. |
| 4,362,791 A | 12/1982 | Kaneko et al. |
| 4,378,995 A | 4/1983 | Gratzfeld et al. |
| 4,410,606 A | 10/1983 | Loutfy et al. |
| 4,436,711 A | 3/1984 | Olson |
| 4,436,712 A | 3/1984 | Olson |
| 4,436,713 A | 3/1984 | Olson |
| 4,436,714 A | 3/1984 | Olson |
| 4,443,423 A | 4/1984 | Olson |
| 4,443,424 A | 4/1984 | Olson |
| 4,468,441 A | 8/1984 | D'Agostino et al. |
| 4,485,154 A | 11/1984 | Remick et al. |
| 4,520,083 A | 5/1985 | Prater et al. |
| 4,563,403 A | 1/1986 | Julian |
| 4,592,973 A | 6/1986 | Pemsler et al. |
| 4,617,244 A | 10/1986 | Greene |
| 4,680,308 A | 7/1987 | Schwartz et al. |
| 4,818,646 A | 4/1989 | Takakubo et al. |
| 4,880,758 A | 11/1989 | Heistand, II et al. |
| 4,952,289 A | 8/1990 | Ciccone et al. |
| 4,959,135 A | 9/1990 | Zenner et al. |
| 4,973,720 A | 11/1990 | Saito et al. |
| 5,084,533 A | 1/1992 | Shah et al. |
| 5,122,461 A | 6/1992 | Hsiung et al. |
| 5,264,097 A | 11/1993 | Vaughan |
| 5,302,481 A | 4/1994 | Ong |
| 5,318,865 A | 6/1994 | Kaneko et al. |
| 5,433,934 A | 7/1995 | Chang et al. |
| 5,472,807 A | 12/1995 | Licht et al. |
| 5,643,670 A | 7/1997 | Chung |
| 5,679,239 A | 10/1997 | Blum et al. |
| 5,759,711 A | 6/1998 | Miyabayashi et al. |
| 5,785,841 A | 7/1998 | Tseng |
| 5,876,581 A | 3/1999 | Itaya et al. |
| 5,910,366 A | 6/1999 | Chowdhury et al. |
| 6,001,326 A | 12/1999 | Kim et al. |
| 6,030,517 A | 2/2000 | Lincot et al. |
| 6,054,230 A | 4/2000 | Kato |
| 6,461,772 B1 | 10/2002 | Miyake et al. |
| 6,475,661 B1 | 11/2002 | Pellegri et al. |
| 6,485,868 B1 | 11/2002 | Tsujioka et al. |
| 6,555,989 B1 | 4/2003 | Pearson |
| 6,585,951 B1 | 7/2003 | Hong et al. |
| 6,624,328 B1 | 9/2003 | Guerra |
| 7,046,418 B2 | 5/2006 | Lin et al. |
| 7,193,764 B2 | 3/2007 | Lin et al. |
| 7,223,833 B1 | 5/2007 | Nielsen et al. |
| 7,252,905 B2 | 8/2007 | Clarke et al. |
| 7,265,162 B2 | 9/2007 | Yandrasits et al. |
| 7,348,088 B2 | 3/2008 | Hamrock et al. |
| 7,463,917 B2 | 12/2008 | Martinez |
| 7,508,568 B2 | 3/2009 | Lin et al. |
| 7,550,231 B2 | 6/2009 | Stauffer |
| 7,557,164 B2 | 7/2009 | Felix et al. |
| 7,625,663 B2 | 12/2009 | Clarke et al. |
| 7,645,540 B2 | 1/2010 | Boone et al. |
| 7,678,728 B2 | 3/2010 | Olson et al. |
| 7,745,056 B2 | 6/2010 | Lee et al. |
| 7,767,777 B2 | 8/2010 | Buesing et al. |
| 7,927,731 B2 | 4/2011 | Sahu |
| 7,931,981 B2 | 4/2011 | Boone et al. |
| 7,935,366 B2 | 5/2011 | Pahuja et al. |
| 7,998,335 B2 | 8/2011 | Feeney et al. |
| 8,129,554 B2 | 3/2012 | Schwaiger |
| 8,187,441 B2 | 5/2012 | Evans et al. |
| 8,445,118 B2 | 5/2013 | Cordonier et al. |
| 8,492,581 B2 | 7/2013 | Frost et al. |
| 8,691,413 B2 | 4/2014 | Esswein et al. |
| 8,753,761 B2 | 6/2014 | Esswein et al. |
| 9,300,000 B2 | 3/2016 | Jansen et al. |
| 9,382,274 B2 | 7/2016 | Esswein et al. |
| 9,409,842 B1 | 8/2016 | Fu et al. |
| 2002/0163772 A1 | 11/2002 | Kamath et al. |
| 2002/0177042 A1 | 11/2002 | Amendola |
| 2003/0068561 A1 | 4/2003 | Okahara et al. |
| 2003/0143456 A1 | 7/2003 | Kazacos et al. |
| 2003/0228394 A1 | 12/2003 | Abdel-Monem et al. |
| 2004/0096746 A1 | 5/2004 | Wietelmann et al. |
| 2005/0098437 A1 | 5/2005 | Shiepe |
| 2005/0244707 A1 | 11/2005 | Skyllas-Kazacos et al. |
| 2006/0047094 A1 | 3/2006 | Cherkasov et al. |
| 2007/0275291 A1 | 11/2007 | Gu et al. |
| 2008/0274385 A1 | 11/2008 | Creeth |
| 2008/0292964 A1 | 11/2008 | Kazacos et al. |
| 2009/0110998 A1 | 4/2009 | Miyachi et al. |
| 2009/0130525 A1 | 5/2009 | Miyachi et al. |
| 2009/0208807 A1 | 8/2009 | Miyachi et al. |
| 2009/0308752 A1 | 12/2009 | Evans et al. |
| 2010/0003586 A1 | 1/2010 | Sahu |
| 2010/0059388 A1 | 3/2010 | Clarke et al. |
| 2010/0086823 A1 | 4/2010 | Koshino et al. |
| 2010/0086983 A1 | 4/2010 | Gellett et al. |
| 2010/0239946 A1 | 9/2010 | Miyachi et al. |
| 2011/0014532 A1 | 1/2011 | Knuckey et al. |
| 2011/0136016 A1 | 6/2011 | Huang et al. |
| 2011/0189549 A1 | 8/2011 | Sun et al. |
| 2011/0195283 A1 | 8/2011 | Sun et al. |
| 2011/0200890 A1 | 8/2011 | Kocherginsky |
| 2011/0223450 A1 | 9/2011 | Horne et al. |
| 2011/0244277 A1 | 10/2011 | Gordon, II et al. |
| 2011/0244367 A1 | 10/2011 | Watahiki et al. |
| 2012/0052347 A1 | 3/2012 | Wilson et al. |
| 2012/0077095 A1 | 3/2012 | Roumi et al. |
| 2012/0107661 A1 | 5/2012 | Lee et al. |
| 2012/0135278 A1 | 5/2012 | Yoshie et al. |
| 2012/0171541 A1 | 7/2012 | Park et al. |
| 2012/0183868 A1 | 7/2012 | Toussaint et al. |
| 2012/0196188 A1 | 8/2012 | Zhang et al. |
| 2012/0202099 A1 | 8/2012 | Perry et al. |
| 2012/0208061 A1 | 8/2012 | Sahu et al. |
| 2012/0244406 A1 | 9/2012 | Xia et al. |
| 2012/0263990 A1 | 10/2012 | Kim |
| 2013/0004819 A1 | 1/2013 | Mun et al. |
| 2013/0157087 A1 | 6/2013 | Pandy et al. |
| 2013/0252062 A1 | 9/2013 | Wilkins et al. |

(56) References Cited

U.S. PATENT DOCUMENTS

| | | |
|---|---|---|
| 2013/0252137 A1 | 9/2013 | Zhang et al. |
| 2014/0028260 A1* | 1/2014 | Goeltz .................. H01M 8/188 320/127 |
| 2014/0028261 A1 | 1/2014 | Esswein et al. |
| 2014/0030572 A1 | 1/2014 | Esswein et al. |
| 2014/0030573 A1 | 1/2014 | Esswein et al. |
| 2014/0030631 A1 | 1/2014 | Esswein et al. |
| 2014/0051003 A1 | 2/2014 | Esswein et al. |
| 2014/0080035 A1 | 3/2014 | Esswein et al. |
| 2014/0138576 A1 | 5/2014 | Esswein et al. |
| 2014/0178735 A1 | 6/2014 | Wang et al. |
| 2014/0193687 A1 | 7/2014 | Park et al. |
| 2014/0239906 A1 | 8/2014 | Anderson et al. |
| 2014/0274936 A1 | 9/2014 | Piccariello et al. |
| 2014/0349177 A1 | 11/2014 | Chung et al. |
| 2014/0377666 A1 | 12/2014 | Kodama et al. |
| 2015/0236543 A1 | 8/2015 | Brushett et al. |
| 2015/0372333 A1 | 12/2015 | Odom et al. |
| 2016/0066578 A1 | 3/2016 | Ala'Aldeen et al. |
| 2016/0149251 A1 | 5/2016 | Reece |
| 2016/0208165 A1 | 7/2016 | Li et al. |
| 2016/0264603 A1 | 9/2016 | Esswein et al. |
| 2016/0268623 A1 | 9/2016 | Esswein et al. |
| 2016/0272659 A1 | 9/2016 | King et al. |
| 2016/0276693 A1 | 9/2016 | Goeltz et al. |
| 2016/0276694 A1 | 9/2016 | Goeltz et al. |
| 2016/0276695 A1 | 9/2016 | Esswein et al. |
| 2017/0253620 A1 | 9/2017 | Humbarger et al. |
| 2017/0256811 A1 | 9/2017 | Humbarger et al. |
| 2017/0271704 A1 | 9/2017 | Morris-Cohen |

FOREIGN PATENT DOCUMENTS

| | | |
|---|---|---|
| EP | 0814527 A2 | 12/1997 |
| EP | 1290068 A2 | 3/2003 |
| EP | 1411576 A1 | 4/2004 |
| EP | 1901379 A1 | 3/2008 |
| EP | 2235781 A1 | 10/2010 |
| EP | 2463950 A1 | 6/2012 |
| FR | 1533662 A | 7/1968 |
| GB | 1354886 A | 6/1974 |
| WO | WO-95/12219 A1 | 5/1995 |
| WO | WO-1997/017354 A1 | 5/1997 |
| WO | WO-2004/095602 A2 | 11/2004 |
| WO | WO-2006/135958 A1 | 12/2006 |
| WO | WO-2007/044852 A2 | 4/2007 |
| WO | WO-2007/101284 A1 | 9/2007 |
| WO | WO-2011/075135 A1 | 6/2011 |
| WO | WO-2011/098781 A1 | 8/2011 |
| WO | WO-2011/149624 A1 | 12/2011 |
| WO | WO-2012/075810 A1 | 6/2012 |
| WO | WO-2013/006427 A1 | 1/2013 |
| WO | WO-2013/048603 A1 | 4/2013 |
| WO | WO-2015/069439 A1 | 5/2015 |
| WO | WO 2016/166595 A1 | 10/2016 |

OTHER PUBLICATIONS

Borgias et al. Inorg. Chem. 1984, 23, 1009-1016.*
Wang et al., "Issues in Freeze Drying of Aqueous Solutions," Chinese Journal of Chemical Engineering, 2012, 20(3), pp. 551-559.
Ahluwalia et al., Intermediates for Organic Synthesis, Chapter 1, Phenols, Sections 1.21 and 1.23, (2003), I.K. International Pvt. Ltd.
Abdulghani et al., "Preparation and Characterization of Di-, Tri-, and Tetranuclear Schiff Base Complexes Derived from Diamines and 3,4-Dihydroxybenzaldehyde," Hindawi Publishing Corp, Bioinorganic Chemistry and Applications, 2013, pp. 1-14.
IUPAC Compendium of Chemical Terminology, "coordinatively unsaturated complex," 1997, http://old.iupac.org/goldbook/C01334.pdf.
Mansoor, "Mixed Metal Complexes of Copper (II), Nickel (II) and Zinc (II) Involving Dopa and Dopamine," International Journal of ChemTech Research, Jan.-Mar. 2010, vol. 2, No. 1, pp. 640-645.
International Search Report and Written Opinion from PCT/US17/14764, dated Apr. 20, 2017.
International Search Report and Written Opinion from PCT/US16/69190, dated May 3, 2017.
International Search Report and Written Opinion from PCT/US2017/022203, dated Jun. 6, 2017.
Ahn et al., "A Study of Benzene 1,2,4-Trisphosphate Derivatives as Inositol 1,4,5-Trisphosphate 3-Kinase Inhibitors," Bull. Korean Chem. Soc., 2002, pp. 515-517, vol. 23., No. 3.
Borgias, "Synthetic, structural, and physical studies of titanium complexes of catechol and 3,5-di-tert-butylcatechol," Inorg. Chem., Apr. 1984, 23(8), 1009-1016.
Bosch et al., "Novel Catalysis of Hydroquinone Autoxidation with Nitrogen Oxides," J. Org. Chem., 1994, pp. 2529-2536, 59.
Brezina, "Study of the reduction of oxygen on a carbon paste electrode in an alkaline medium," Coll. Czech. Chem. Commun., 1973, 38(10), 3024-3031.
Caulton, "Systematics and Future Projections Concerning Redox-Noninnocent Amide/Imine Ligands," Eur. J. Inorg. Chem., Jan. 2012, 2012(3), 435-443.
Cerofontain et al. "Sulfonation and sulfation on reaction of 1,2-dihydroxybenzene and its methyl ethers in concentrated aqueous sulfuric acid," Recl Trav Chim Pays-Bas, 1988, pp. 325-330, vol. 107.
Chen, "Solution Redox Couples for Electrochemical Energy Storage: I. Iron (III)-Iron (II) Complexes with O-Phenanthroline and Related Ligands," Journal of the Electrochemical Society, Jul. 1981, 128(7), 1460-1467.
Cohen, "The Association of Ferrocyanide Ions With Various Cations," J. Phys. Chem., Aug. 1957, 61(8), 1096-1100.
Davies, "Eiectroceramics from Source Materials via Molecular Intermediates: PbTi03 from Ti02 via [Ti(catecholate)3]2-," J. Am. Ceram. Soc., Aug. 1990, 73(8), 2570-2572.
Davies, "Electroceramics from Source Materials via Molecular Intermediates: BaTI03 from TI02 via [TI(catecholate)3]2-," May 1990, J. Am. Ceram. Soc., Aug. 1990, 73(5), 1429-30.
Dehaen et al, "A Self-Assembled Complex with a Titanium (IV) Catecholate Core as a Potential Bimodal Contrast Agent," Chem Eur J, 2012, pp. 293-302, vol. 18.
Fryda, "Wastewater Treatment With Diamond Electrodes," Diamond Materials, Electrochemical Society Proceedings, 2000, 99(32), 473-483.
Gail, "Cyano Compounds, Inorganic" in Ullmann's Encyclopedia of Industrial Chemistry, 2012, 10, 674-710.
Hollandsworth, "Zinc/Ferrocyanide Battery Development Phase IV" Lockheed Missiles and Space Company, Inc., Contractor report, Sandia Contract DE-AC04-76DP00789, May 1985, 278 pages.
Kim, "Novel catalytic effects of Mn304 for all vanadium redox flow batteries," Chem. Commun., Apr. 2012, 48(44), 5455-5457.
Kulesza, "Electrochemical preparation and characterization of hybrid films composed of Prussian blue type metal hexacyanoferrate and conducting polymer," Electrochimica Acta, Aug. 2001, 46(26-27), 4065-4073.
Lang et al., "Studies on the Biosynthesis of Bovilactone-4,4 and Related Fungal Meroterpenoids," Eur. J. Org. Chem., 2008, pp. 3544-3551.
Lang et al., "Studies on the Structure and Biosynthesis of Tridentoquinone and Related Meroterpenoids from the Mushroom *Suillus tridentinus* (Boletales)," Eur. J. Org. Chem., 2008, pp. 816-825.
Leung, "An undivided zinc-cerium redox flow battery operating at room temperature (295° K)," Electrochemistry Communications, 2011, vol. 13, pp. 770-773.
Leung, "Ce(III)/Ce(iV) in methanesulfonic acid as the positive half cell of a redox flow battery," Electrochimica Acta, 2011, vol. 56, pp. 2145-2153.
Leung, "Characterization of a zinc-cerium flow battery," Journal of Power Sources, 2011, vol. 195, pp. 5174-5185.
Leung, "Development of a Zinc-Cerium Redox Flow Battery", 2011, 352 pages.

(56) References Cited

OTHER PUBLICATIONS

Leung, "Zinc deposition and dissolution in methanesulfonic acid onto a carbon composite electrode as the negative electrode reactions in a hybrid redox flow battery," Electrochimica Acta, 2011, vol. 56, pp. 6536-6546.

Maison, et al., "Effect of Calcination Temperature on Phase Transformation and Particle size of Barium Titanate Fine Powders Synthesized by the Catecholate Process," ScienceAsia, 2001, pp. 239-243, 27.

Mcomie et al. "The Thiele-Winter Acetoxylation of Quinones," Organic Reactions, 1972, pp. 199-277, 19, John Wiley and Sons, Inc., New York.

Modiba, "Electrochemical impedance spectroscopy study of Ce(IV) with aminopolycarboxylate ligands for redox flow batteries applications," Journal of Power Sources, May 2012, vol. 205, 1-9.

Modiba, "Electrochemical study of cerium(IV) in the presence of ethylenediaminetetraacetic acid (EDTA) and diethylenetriaminepentaacetate (DTPA) ligands," Journal of Applied Electrochemistry, Sep. 2008, 38(9), 1293-1299.

Modiba, "Electrolytes for redox flow battery systems," Dissertation presented for the degree of Doctor of Philosophy Chemistry at the University of Stellenbosch, Department of Chemistry and Polymer Science, Mar. 2010.

Murakami et al., "The Chelating Behavior of Catechol-4-sulfonate with Iron(III) Ion," Bulletin of the Chemical Society of Japan, 1963, pp. 1408-1411; vol. 36.

Nguyen, "Flow Batteries," The Electrochemical Society Interface, Fall2010, 19(3), 54-56.

Pharr, "Infrared Spectroelectrochemical Analysis of Adsorbed Hexacyanoferrate Species Formed during Potential Cycling in the Ferrocyanide/Ferricyanide Redox Couple," Anal. Chem., Nov. 1997, 69(22), 4673-4679.

Raymond, "Coordination isomers of biological iron transport compounds. VI. Models of the enterobactin coordination site. A crystal field effect in the structure of potassium tris( catecholato )chromate( III) and -ferrate( III) sesq u ihyd rates, K3[M( 02C6H4 )3]. 1 . 5H20, M=chromium, iron," J. Am. Chem. Soc., Mar. 1976, 98(7), 1767-1774.

Saito et al. "DPPH radical-scavenging reaction of protocatechuic acid: differnce in reactivity between acids and their esters," Hely Chim Acta, 2006, pp. 1395-1407, vol. 89.

Sever et al, "Visible absorption spectra of metal-catecholate and metal-tironate complexes," Dalton Trans., pp. 1061-1072, 2004.

SIGMA-ALDRICH Tris(hydroxymethyl)aminomethane, 2015.

Soloveichik, "Flow Batteries: Current Status and Trends," 2015, Chem. Rev., 115 (20), pp. 11533-11558.

Sommer, "Titanium (IV) complexes with ligands having oxygen donor atoms in aqueous solutions," Zeitschrift fur Anorganische und Aligemeine Chemie, Mar. 1963, pp. 191-197, vol. 321, issue 3-4.

Spyroudis, "Hydroxyquinones: Synthesis and Reactivity," Molecules, 2000, pp. 1291-1330, 5.

Steenken, "One-electron redox potentials of phenols. Hydroxy- and aminophenols and related compounds of biological interest," J. Phys. Chem., Sep. 1982, 86(18), 3661-3667.

Torres-Gomez, "Energy Storage in Hybrid Organic-Inorganic Materials Hexacyanoferrate-Doped Polypyrrole as Cathode in Reversible Lithium Cells," J. of the Electrochemical Society, 2000, 147(7), 2513-2516.

Trant, "Solubility of Sodium Ferrocyanide and Potassium Ferrocyanide in Solutions of NaOH and KOH Mixtures at 25.degree. C.," University of Rochester, The David T. Kearns Center, Xerox Undergraduate Research Fellows Program, Jul. 28, 2011, 1 page.

Vercillo, "Solubility of Sodium Ferrocyanide in Sodium Hydroxide and Potassium Ferrocyanide in Potassium Hydroxide," University of Rochester, The David T. Kearns Center, Xerox Undergraduate Research Fellows Program, Jul. 28, 2011, 1 page.

Wang, "Determination of iron, titanium, osmium, and aluminum with tiron by reversephase high performance liquid chromatography/electrochemistry," Microchem. J., Jun. 1991, 43(3), 191-197.

Weber, "Redox flow batteries: a review," Journal of Applied Electrochemistry, Oct. 2011, 41(10), 1137-1164.

Westervelt, "A Study of the Calcium Complex of the Potassium Salt of Catechol-4-Sulfonate in Aqueous, Alkalino Media," Jan. 1981, Doctoral Dissertation, retrieved from https://smartech.gatech.edu/bitstream/handle/1853/5723/westervelt-iii_hh.pdf.

Ali et al., "Synthesis and Processing Characteristics of $Ba_{0.65}Sr_{0.35}TiO_3$ Powders from Catecholate Precursors," J Am Ceram Soc, 1993, pp. 2321-2326, vol. 76, No. 9.

Devi et al., "pH-metric investigation on Mixed-Ligand Complexes of Ca(II), Mg(II) and Zn(II) with L-Dopa and 1,10 Phenantroline in Propylene glycol-Water Mixtures," RRJC, Oct.-Dec. 2012, vol. 1, Issue 1, pp. 13-22.

Xu, "Mechanics of metal-catecholate complexes: The roles of coordination state and metal types," Scientific Reports, Oct. 10, 2013, 3:2914, pp. 1-7.

Vliet et al., "Hydroxyhydroquinone Triacetate," Organic Synthesys, 1941, Coll vol. 1, p. 317 (1941), vol. 4, p. 35 (1925) 3 pages.

International Search Report and Written Opinion dated Jan. 19, 2017 from International Application No. PCT/US16/58433.

International Search Report and Written Opinion dated Feb. 17, 2017 from International Application No. PCT/US16/65159.

\* cited by examiner

AQUEOUS METHODS FOR FORMING TITANIUM CATECHOLATE COMPLEXES AND ASSOCIATED COMPOSITIONS

CROSS-REFERENCE TO RELATED APPLICATIONS

The present application claims the benefit of priority under 35 U.S.C. § 119 from U.S. Provisional Patent Applications 62/441,146; 62/441,149; 62/441,150; 62/441,151; 62/441,153 and 62/441,154, each filed on Dec. 30, 2016 and incorporated herein by reference in its entirety.

STATEMENT REGARDING FEDERALLY SPONSORED RESEARCH OR DEVELOPMENT

Not applicable.

FIELD

The present disclosure generally relates to energy storage and, more specifically, to methods for synthesizing titanium catecholate complexes as active materials for use in energy storage systems.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing sides of a membrane or separator in an electrochemical cell containing negative and positive electrodes. The flow battery is charged or discharged through electrochemical reactions of the active materials that occur inside the two half-cells. As used herein, the terms "active material," "electroactive material," "redox-active material" or variants thereof synonymously refer to materials that undergo a change in oxidation state during operation of a flow battery or like electrochemical energy storage system (i.e., during charging or discharging). Although flow batteries hold significant promise for large-scale energy storage applications, they have often been plagued by sub-optimal energy storage performance (e.g., round trip energy efficiency) and limited cycle life, among other factors. Despite significant investigational efforts, no commercially viable flow battery technologies have yet been developed.

Metal-based active materials can often be desirable for use in flow batteries and other electrochemical energy storage systems. Although non-ligated metal ions (e.g., dissolved salts of a redox-active metal) can be used as an active material, it can often be more desirable to utilize coordination complexes for this purpose. As used herein, the terms "coordination complex," "coordination compound," "metal-ligand complex," or simply "complex" synonymously refer to a compound having at least one covalent bond formed between a metal center and a donor ligand. The metal center can cycle between an oxidized form and a reduced form in an electrolyte solution, where the oxidized and reduced forms of the metal center represent states of full charge or full discharge depending upon the particular half-cell in which the coordination complex is present. In certain instances, additional electrons can be transferred through the oxidation or reduction of one or more of the molecules constituting the ligands.

Titanium complexes can be particularly desirable active materials for use in flow batteries and other electrochemical energy storage systems, since such metal complexes can provide good half-cell potentials (e.g., less than −0.3 V) and current efficiencies exceeding 85% at high current density values (e.g., greater than 100 mA/cm$^2$). Various titanium catecholate complexes can be especially desirable active materials in this regard, since they are relatively stable complexes and have a significant degree of solubility in aqueous media. Although various methods utilizing organic solvents are available for synthesizing titanium catecholate complexes (also referred to herein as titanium catechol complexes, titanium catecholate coordination compounds, catechol complexes of titanium, and/or similar terms), none are presently viable for producing the significant quantities of these complexes needed to support commercial-scale energy storage applications. In addition, residual organic solvents from currently employed syntheses of titanium catecholate complexes can become incorporated in aqueous electrolyte solutions in which the complexes are present, which can be undesirable in various instances. Certain residual organic solvents, for example, can cause membrane swelling in a flow battery, which can compromise the flow battery's operation. In addition, residual organic solvents can present environmental or safety concerns in some instances.

In addition, titanium catecholate complexes are usually synthesized in a salt form for incorporation in aqueous electrolyte solutions. In such salt forms, the titanium catecholate complex itself bears a formal negative charge and one or more positively charged counterions are present to maintain charge balance. If extraneous salts (i.e., salts not associated with the titanium catecholate complex) are also present in an aqueous electrolyte solution, the solubility of the complex can be undesirably lowered through a common ion effect. Since most conventional syntheses of titanium catecholate complexes liberate at least one byproduct species that can readily lead to extraneous salt formation, it can be difficult to realize maximized solubility levels for these complexes when conventional synthesis conditions are employed. The decreased solubility values can undesirably impact energy density values and other parameters of interest.

In view of the foregoing, improved methods for synthesizing titanium catecholate complexes to support their use as active materials in energy storage applications would be highly desirable in the art. The present disclosure satisfies the foregoing needs and provides related advantages as well.

SUMMARY

In various embodiments, methods for synthesizing coordination complexes containing titanium are described herein, particularly titanium catecholate complexes. The methods can include: providing an aqueous solution containing a catechol compound, reacting a titanium reagent with the catechol compound in the aqueous solution to form an intermediate titanium catecholate complex, isolating the intermediate titanium catecholate complex as a solid or slurry, and reacting a ligatable compound with the intermediate titanium catecholate complex in the presence of a base to produce a salt form titanium catecholate complex further containing at least one additional ligand.

In some embodiments, methods for synthesizing titanium catecholate complexes can include: providing an aqueous solution containing a catechol compound, adding a titanium reagent to the aqueous solution, and reacting the titanium reagent with the catechol compound to form an intermediate titanium catecholate complex containing a 4-coordinate titanium (IV) center and two catecholate ligands. The methods can further include reacting a ligatable compound with the intermediate titanium catecholate complex in the presence of a base to produce a salt form titanium catecholate complex further containing at least one additional ligand.

In some embodiments, methods of the present disclosure can include combining a catechol compound and a titanium reagent in an aqueous solution, and reacting the catechol compound with the titanium reagent in the aqueous solution to form a titanium catecholate complex containing one or more catecholate ligands. The titanium reagent is titanium tetrachloride.

In other various embodiments, methods of the present disclosure can include providing an aqueous solution containing a hydroxybenzene compound, combining a titanium reagent with the aqueous solution to form a reaction mixture, and isolating a titanium coordination complex from the reaction mixture as a solid or slurry, where the titanium coordination complex contains at least one hydroxybenzene ligand. In more specific embodiments, the at least one hydroxybenzene compound can include at least one catechol compound.

In some or other embodiments, methods of the present disclosure can include providing a titanium coordination complex containing at least one hydroxybenzene ligand, and contact a slurry or melt of the titanium coordination complex with a slurry or melt of a ligatable compound to produce a titanium coordination complex containing at least one hydroxybenzene ligand and at least one additional ligand.

In still other various embodiments, compositions of the present disclosure can include: a salt form titanium catecholate complex containing two catecholate ligands and at least one additional ligand. The compositions are substantially free of organic solvents and extraneous salt not associated with the salt form titanium catecholate complex. Flow batteries containing the compositions in at least one electrolyte solution are also described herein.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
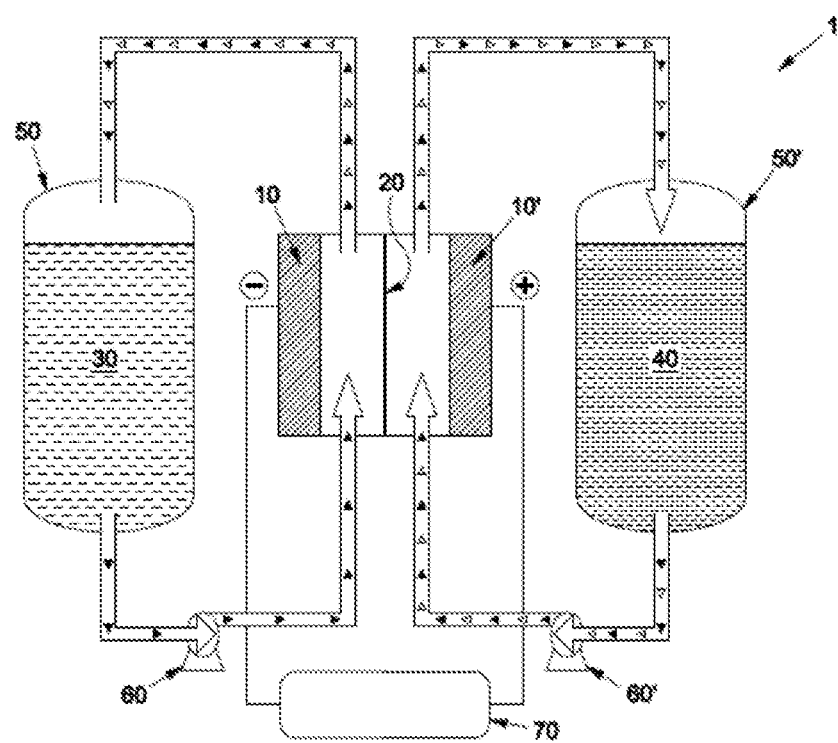
FIG. 1 shows a schematic of an illustrative flow battery.

The present disclosure is directed, in part, to flow batteries and compositions containing salt form titanium catecholate complexes, particularly alkali metal salt forms, that are free or substantially free of extraneous salts and organic solvents. The present disclosure is also directed, in part, to methods for synthesizing titanium catecholate complexes in an aqueous solution. More generally, the present disclosure is also directed to reacting a suitable titanium reagent with a hydroxybenzene compound in an aqueous solution to produce a titanium coordination complex.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that are operable on a large scale while maintaining high efficiency values can be extremely desirable. Flow batteries employing coordination complexes as active materials have generated significant interest in this regard. Exemplary description of illustrative flow batteries, their use, and operating characteristics is provided hereinbelow. Titanium coordination complexes, particularly those containing at least one catecholate ligand, can be especially desirable due to their favorable half-cell potentials and high current efficiency values, among other factors. Although various techniques are presently available in the art for synthesizing titanium catecholate complexes, none are believed to be suitable for producing high-purity active materials at the very large (multi-pound up to multi-ton) scales needed to support commercial energy storage applications. Raw material costs, labor expenses, low yields and insufficient purity are among the factors that can be problematic at present for supplying commercially viable quantities of these types of active materials. Other metal complexes containing alternative metal centers and/or ligands differing from catecholate ligands can be similarly problematic in this regard.

As used herein, the term "catechol" refers to a compound having an aromatic ring bearing hydroxyl groups on adjacent carbon atoms (i.e., 1,2-hydroxyl groups). Optional substitution can also be present in addition to the 1,2-hydroxyl groups. As used herein, the term "catecholate" refers to a substituted or unsubstituted catechol compound that is bound to a metal center via a metal-ligand bond, particularly a titanium metal center. As used herein, the term "unsubstituted catecholate" refers to the particular case where 1,2-dihydroxybenzene (catechol) is bound to a metal center via a metal-ligand bond. The optional substitution on catecholate ligands can serve a number of purposes such as, for example, altering the solubility characteristics and/or half-cell potentials of the metal complexes that they produce. Monosulfonated catecholate ligands, for example, can improve the solubility of titanium coordination complexes while maintaining desirable electrochemical properties that are at least comparable to those obtained when only unsubstituted catecholate ligands are present. As used herein, the term "monosulfonated" refers to one sulfonic acid group or any salt thereof being present on an aromatic ring. Catecholate ligands bearing an additional hydroxyl group, such as pyrogallol, 1,2,4-trihydroxybenzene and gallic acid, for example, can be similarly advantageous in this regard. Catecholates such as the foregoing can also be optionally further substituted. Other advantageous catecholate ligands bearing further substitution are discussed hereinbelow. It is to be understood that catechols and catecholates suitable for use in the present disclosure also include positional isomers that are not necessarily specifically illustrated herein. In addition, monosubstituted catechols and catecholates can also be polysubstituted in some embodiments, particularly disubstituted or trisubstituted, unless otherwise indicated herein.

Conventional syntheses of titanium coordination complexes, including titanium catecholate complexes, are usually conducted in an organic solvent, particularly an anhydrous organic solvent, by adding a reactive titanium reagent thereto. The need for substantially anhydrous conditions is dictated by the extreme reactivity of many titanium reagents, such as titanium tetrahalides and titanium oxyhalides, with water under typical reaction conditions to form titanium dioxide. Titanium dioxide is a generally intractable material and is not especially applicable toward forming titanium coordination complexes unless it undergoes further processing. As such, the production of titanium dioxide during complex formation can be exceedingly problematic, because it wastes costly titanium reagent and reduces yields of the desired titanium coordination complex. In addition, the extreme insolubility of titanium dioxide can be especially problematic should this compound become incorporated in an electrolyte solution of a flow battery, where it can occlude flow pathways and damage various system components, such as a flow battery's separator.

Although frequently used when synthesizing titanium coordination complexes, organic solvents can present particular issues in some cases. When organic solvents are used during syntheses of titanium coordination complexes, residual organic solvent can be retained by the titanium coordination complexes and become incorporated in an aqueous electrolyte solution. Residual organic solvent in an aqueous electrolyte solution can contact a flow battery's membrane or separator and result in swelling, which can undesirably compromise the flow battery's operation. Organic solvents also add to the material cost of fabricating a flow battery, and organic solvents can further produce undesirable environmental impacts. In addition, organic solvents can retain byproduct species liberated during syntheses of the titanium coordination complexes that, if not properly managed, can lead to extraneous salt production upon generating a salt form of the titanium coordination complexes, thereby reducing purity and potentially impacting other factors such as solubility. Specifically, byproduct species, such as hydrogen halides and other base-reactive substances, can react to form extraneous salts in addition to a desired salt form titanium coordination complex.

The present inventors discovered processes for synthesizing titanium catecholate complexes and other metal complexes that can proceed from readily available and relatively inexpensive starting materials and take place in an aqueous solution. These syntheses largely employ the same water-reactive titanium reagents as those used in syntheses utilizing organic solvents. The ability to utilize water-reactive titanium reagents with an aqueous solution when forming titanium catecholate complexes is extremely surprising, since one would ordinarily expect the titanium reagent to generate primarily titanium dioxide and very little of the titanium catecholate complex, if any. Use of an aqueous solution when synthesizing titanium catecholate complexes further averts many of the problematic issues accompanying syntheses taking place in organic solvents. At the very least, the cost, safety and environmental profile of synthesizing titanium catecholate complexes can be improved by foregoing the use of an organic solvent. Even more significantly, potential membrane swelling issues associated with incorporating residual organic solvents in an aqueous electrolyte solution can be substantially eliminated. In some instances, the disclosure herein can be extended to hydroxybenzene compounds, in general, for purposes of synthesizing titanium coordination complexes.

As a further advantage, the use of an aqueous solution can facilitate separation of the titanium catecholate complexes from byproduct species that can otherwise lead to extraneous salt formation. Although hydrogen halides and similar byproduct species can become incorporated in an aqueous solution upon forming a titanium catecholate complex from a titanium reagent, the syntheses described herein allow separation of the initially formed complex to take place from the aqueous solution, thereby also removing the solubilized byproduct species from the titanium catecholate complex. More specifically, the inventors found that the reaction between a suitable titanium reagent and at least one catechol compound in an aqueous solution, particularly an aqueous solution with acidic pH values, leads to formation of an intermediate titanium catecholate complex that is insoluble in the reaction mixture. The insolubility of the intermediate titanium catecholate complex allows the complex to be isolated by filtration, centrifugation, or decantation, for example, and separated from the byproduct species which remain solubilized in the aqueous solution. Further description of the intermediate titanium catecholate complexes is provided hereinbelow.

Subsequently, ideally but not necessarily after being isolated from the aqueous solution, the intermediate titanium catecholate complex can be reacted with a ligatable compound, which can be a catechol compound or another ligatable substance, to form a titanium catecholate complex containing at least one additional ligand. The number of additional ligands that are added to the titanium (IV) center to achieve a full coordination sphere of six metal-ligand bonds depends upon the denticity of the ligatable substance. The reaction can be facilitated in the presence of a base, which can further lead to generation of a salt form titanium catecholate complex, in which two catecholate ligands and at least one additional ligand are present. For flow batteries, an especially desirable salt form for the titanium catecholate complexes can be an alkali metal salt form in some embodiments, although alternative salt forms can also be suitable, as discussed herein. Because hydrogen halide byproduct species and other base-reactive materials can be removed with the mother liquor when isolating the intermediate titanium catecholate complex, generations of the salt form titanium catecholate complexes in the presence of a base does not lead to production of substantial quantities of extraneous salt(s).

Suitable titanium (IV) reagents such as titanium tetrahalides and titanium oxyhalides can be used in the embodiments of the present disclosure. As used herein, the term "titanium reagent" refers to any chemical compound containing titanium. Titanium (IV) oxysulfate and titanium (IV) alkoxides can also be used in some alternative embodiments. Byproduct species liberated from each of these titanium (IV) reagents upon their reaction with a catechol compound or other ligatable compound can be separated from the resulting intermediate titanium catecholate complex upon separation of the aqueous mother liquor. Advantageously, these and similar titanium reagents can be combined with the aqueous solution more rapidly in the syntheses of the present disclosure than can be performed in corresponding syntheses employing an organic solvent.

Further advantageously, the syntheses and further processing of the titanium catecholate complexes can be conducted on a wide range of scales, ranging from gram-scale laboratory processes up to multi-ton production. Because the syntheses described herein generate one or more byproduct species that can be removed with the aqueous mother liquor, salt form titanium catecholate complexes can be obtained with good purity levels in high-concentration aqueous phases that can be suitable for use in flow batteries and other electrochemical energy storage systems with little to no further processing. In particular, the syntheses described herein allow the salt form titanium catecholate complexes to be produced in an aqueous phase without forming significant amounts of extraneous salts, such as extraneous alkali metal halide salts, that are not associated with the titanium catecholate complexes in their desired salt form. That is, the syntheses described herein do not produce a substantial amount of additional salt co-product when generating the salt form titanium catecholate complexes. Because minimal workup is needed, production runs can provide large quantities of solubilized product or an intermediate product in a relatively short amount of time. Accordingly, the syntheses described herein are readily amenable to scale up to a desired level. Further, the syntheses described herein can be readily extended to continuous modes of operation, rather than batchwise processes.

In some embodiments, the intermediate titanium catecholate complex can be converted into an alkali metal salt form titanium catecholate complex through reaction with an alkali metal base, particularly using an alkaline aqueous solution. As used herein, the term "alkali metal" refers to a metal in Group I of the periodic table, such as lithium, sodium or potassium. Sodium, potassium, or mixed sodium/potassium salt forms can be particularly desirable salt forms for incorporation in an electrolyte solution of a flow battery. Although alkali metal salt form titanium catecholate complexes can be advantageous for use in conjunction with the components of flow batteries and other electrochemical systems, it is to be recognized that alternative salt forms can be synthesized using other bases. For example, alkaline earth metal salt form titanium catecholate complexes can be synthesized by using an alkaline earth metal base, such as calcium hydroxide. Other salt forms, such as ammonium, phosphonium, sulfonium, tetraalkylammonium, tetraarylammonium, mixed alkyl and aryl tetrasubstituted ammonium, tetraarylphosphonium, iminium, and nitronium salt forms, for example, can also be prepared and used similarly. Mixed salt forms, which can desirably have improved aqueous phase solubility in some cases, are also possible in some embodiments of the present disclosure.

Although titanium catecholate complexes can be advantageous for use in the further applications described herein, other metal catecholate complexes can also be suitably produced via similar syntheses and incorporated in flow batteries and other electrochemical energy storage systems. Metal catecholate complexes containing alternative metals such as, for example, Al, Ca, Co, Cr, Sr, Cu, Fe, Hf, Mg, Mn, Mo, Ni, Pd, Pt, Ru, Sn, Zn, Zr, V, W and U can be synthesized through similar procedures and utilized as the active material for a flow battery. Lanthanide and actinide reagents that are reactive with catechol compounds can also be suitable in this regard. Like titanium, zirconium and hafnium coordination compounds can possess highly desirable properties when utilized as an active material in a flow battery. Accordingly, the disclosure herein directed to titanium can be extended to the foregoing alternative metals without limitation by one having ordinary skill in the art.

Furthermore, the disclosure herein can also be extended to titanium and other metal coordination complexes that contain only catecholate ligands, combinations of one or more catecholate ligands with other non-catecholate ligands, or only non-catecholate ligands. Suitable non-catecholate ligands can include any of monodentate, bidentate or tridentate ligands, some examples of which are provided hereinbelow. Bidentate ligands can be especially desirable since they complex metal centers in a similar manner to catechol compounds and can serve as a direct replacement thereof. In addition, the disclosure herein can be extended to other hydroxybenzene compounds, including monohydroxybenzene compounds, in some instances. Accordingly, "hydroxybenzene" refers to compounds having on the benzene ring one or more hydroxyl groups and in some instances a wide range of additional substituents which may or may not be ligatable or otherwise be complexed to metal centers. Illustrative, non-limiting, examples of such substituents include amino groups which may be further substituted in some instances and sulfonate groups (in acid or salt form).

In various embodiments, the present disclosure describes methods including: providing an aqueous solution containing a catechol compound, reacting a titanium reagent with the catechol compound in the aqueous solution to form an intermediate titanium catecholate complex, isolating the intermediate titanium catecholate complex as a solid or slurry, and reacting a ligatable compound with the intermediate titanium catecholate complex in the presence of a base to produce a salt form titanium catecholate complex further containing at least one additional ligand. In some embodiments, the aqueous solution can have a pH of about 7 or less As indicated above, a byproduct species can be generated when forming the intermediate titanium catecholate complex. The byproduct species can be soluble in the reaction mixture, whereas the intermediate titanium catecholate complex is not. As such, the byproduct species can be readily removed from the intermediate titanium catecholate complex upon isolating the intermediate titanium catecholate complex. The salt form titanium catecholate complex and aqueous phases containing these complexes can be free or substantially free of extraneous salts, such as alkali metal halide salts. As used herein, the term "substantially free of an extraneous salt" refers to about 0.01 molar equivalents or less of the extraneous salt being present relative to the salt form titanium catecholate complex. As discussed above, minimizing the formation of extraneous salts can be desirable for improving solubility of the salt form titanium catecholate complexes.

Moreover, because the syntheses disclosed herein take place in an aqueous solution, the salt form titanium catecholate complexes and aqueous phases containing these complexes can be free of organic solvents. Minimizing or eliminating the presence of residual organic solvents in aqueous phases containing salt form titanium catecholate complexes can be desirable for minimizing interactions of the organic solvent with a membrane or separator in a flow battery.

In more particular embodiments, the methods of the present disclosure can include producing the salt form titanium catecholate complex in an aqueous phase. The base used to promote production of the salt form titanium catecholate complex can be present in an alkaline aqueous solution. The alkaline aqueous solution can be added to the intermediate titanium catecholate complex or vice versa, or the base can be added to a suspension of the intermediate titanium catecholate complex with water or another aqueous phase. As it forms, the salt form titanium catecholate complex becomes soluble in the aqueous phase. Because the syntheses disclosed herein allow a byproduct species to be removed in an aqueous mother liquor before producing the salt form titanium catecholate complex in the aqueous phase, the resulting aqueous phase can be substantially free of an extraneous salt not associated with the salt form titanium catecholate complex.

In alternative embodiments, the methods can include combining a solid base or a liquid base with the intermediate titanium catecholate complex, separately adding water or another aqueous solution, or vice versa, and reacting the ligatable compound with the intermediate titanium catecholate complex in the presence of the base to produce the desired salt form. Additional disclosure regarding suitable bases and ligatable compounds is provided hereinbelow.

The titanium catecholate complexes of the present disclosure contain titanium in the +4 oxidation state. The most common coordination number of titanium (IV) is 6, although lower coordination numbers are known. As such, the titanium catecholate complexes of the present disclosure, particularly the salt form titanium catecholate complexes, can accommodate at most five other ligands when at least one catecholate ligand is present. Moreover, when the salt form titanium catecholate complexes contain only catecholate ligands, or one or more catecholate ligands in combination with other bidentate ligands, the salt form titanium catecholate complexes can contain at most three bidentate ligands in total. As further discussed herein, the intermediate titanium catecholate complexes are believed to lack a full coordination sphere and are coordinatively unsaturated complexes.

In some embodiments, the ligatable compound can be an additional catechol compound. As such, in some embodiments, the salt form titanium catecholate complex can contain only catecholate ligands. The catechol compound used when forming the intermediate titanium catecholate complex can be the same as or different than the additional catechol compound. In some or other embodiments, the catechol compound used in conjunction with forming the intermediate titanium catecholate complex can constitute a mixture of catechol compounds, such as a first catechol compound and a second catechol compound. Accordingly, in some embodiments, the salt form titanium catecholate complexes can contain a titanium (IV) center and three catecholate ligands, which can all be the same, all differ, or represent a combination of two types of catecholate ligands. In alternative embodiments, non-catecholate ligands can be introduced when producing the salt form titanium catecholate complex from the intermediate catecholate complex, where the catecholate ligands can again be the same or differ. For example, phenolate ligands and other ligatable compounds can also be suitable non-catecholate ligands in the disclosure herein.

Catechol compounds suitable for use in the various embodiments described herein are not considered to be particularly limited. In some embodiments, any of the catechol compounds can be o-catechol itself (i.e., unsubstituted 1,2-dihydroxybenzene). In some or other embodiments, any of the catechol compounds can include at least one substituted catechol compound, which can optionally be present in combination with an unsubstituted catechol compound. Accordingly, the intermediate titanium catecholate complexes and salt form titanium catecholate complexes described herein can include unsubstituted catecholate ligands, substituted catecholate ligands, or any combination thereof. In further embodiments, additional ligands that are non-catecholate in nature can also be present in combination with substituted or unsubstituted catecholate ligands. As referenced above, non-catecholate ligands and other metals can also be suitably used in alternative embodiments of the present disclosure. In particular embodiments, 3,4-dihydroxybenzenesulfonic acid can be an especially desirable substituted catechol compound for promoting solubility of a titanium catecholate complex. Pyrogallol, 1,2,4-trihydroxybenzene and gallic acid are also substituted catechol compounds that can be particularly desirable. These and other similar catechol compounds can be further substituted in some embodiments.

Other examples of substituted catechol compounds that can be suitable for use in the embodiments described herein can include those bearing solubilizing groups to increase the aqueous solubility of the resulting complexes. Non-limiting examples of substituted catechol compounds that can be suitable for use in the embodiments described herein can include those having a structure of

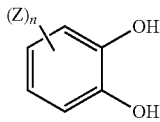

in a neutral form or a salt form. Z is a heteroatom functional group selected from the group consisting of $A^1R^{41}$, $A^2R^{42}$, $A^3R^{43}$, CHO, and sulfonic acid. Variable n is an integer ranging between 1 and 4, such that one or more Z are bound to the substituted catechol compound at an open aromatic ring position. Each Z is the same or different when more than one Z is present. $A^1$ is —$(CH_2)_a$— or —(CHOR)$(CH_2)_a$—, $R^{41}$ is —OR' or —$(OCH_2CH_2O)_bR^1$, a is an integer ranging between 0 and about 6, and b is an integer ranging between 1 and about 10. $A^2$ is —$(CH_2)_c$— or —CH(OR$^2$)(CH$_2$)$_d$—, $R^{42}$ is —NR$^3$R$^4$, a carbon-linked amino acid, or —C(=O)XR$^5$, X is —O— or —NR$^6$—, c is an integer ranging between 0 and about 6, and d is an integer ranging between 0 and about 4. $A^3$ is —O— or —NR$^2$—, $R^{43}$ is —(CHR$^7$)$_e$OR$^1$, —(CHR$^7$)$_e$NR$^3$R$^4$, —(CHR$^7$)$_e$C(=O)XR$^5$, or —C(=O)(CHR$^7$)$_f$R$^8$, e is an integer ranging between 1 and about 6, and f is an integer ranging between 0 and about 6. R is H, $C_1$-$C_6$ alkyl, heteroatom-substituted $C_1$-$C_6$ alkyl, or $C_1$-$C_6$ carboxyalkyl. $R^1$ is H, methyl, ethyl, a $C_2$-$C_6$ polyol bound through an ether linkage or an ester linkage, or $C_1$-$C_6$ carboxyalkyl. $R^2$, $R^3$, $R^4$ and $R^6$ are independently selected from the group consisting of H, $C_1$-$C_6$ alkyl, or heteroatom-substituted $C_1$-$C_6$ alkyl. $R^5$ is H, $C_1$-$C_6$ alkyl, heteroatom-substituted $C_1$-$C_6$ alkyl, a $C_2$-$C_6$ polyol bound through an ester linkage, a hydroxyacid bound through an ester linkage, a polyglycol acid bound through an ester linkage, an amino alcohol bound through an ester linkage or an amide linkage, an amino acid bound through an ester linkage or an amide linkage, or —$(CH_2CH_2O)_bR^1$. $R^7$ is H or OH. $R^8$ is H, $C_1$-$C_6$ alkyl, heteroatom-substituted $C_1$-$C_6$ alkyl, a $C_2$-$C_6$ polyol bound through an ether linkage or an ester linkage, a hydroxyacid bound through an ether linkage or an ester linkage, a polyglycol acid bound through an ether linkage or an ester linkage, an amino alcohol bound through an ether linkage, an ester linkage, or an amide linkage, an amino acid bound through an ether linkage, an ester linkage, or an amide linkage, a carbon-linked amino acid, or —$(OCH_2CH_2O)_bR^1$. In some embodiments, substituted catechol compounds of the structure shown above can be covalently bonded to another such structure, each of which can be independently substituted with $(Z)_n$ as set forth above. Such structures can be joined to one another a single bridging group or a double bridging group.

In some embodiments, the ligatable compound can be a compound that is non-catecholate in nature. As such, in some embodiments, the salt form titanium catecholate complex can contain a mixture of catecholate ligands and at least one additional non-catecholate ligand. In the case of the ligatable compound exhibiting a bidentate binding motif, the salt form titanium catecholate complex can contain one additional ligand further to the catecholate ligands, thereby achieving a full coordination sphere. However, in the case of the ligatable compound exhibiting a monodentate binding motif, the salt form titanium catecholate complex can contain two additional ligands further to the catecholate ligands to achieve a full coordination sphere. Accordingly, in some embodiments, the salt form titanium catecholate complexes can contain a titanium (IV) center and two catecholate ligands in further combination with one or two non-catecholate ligands.

As discussed above, ligands in addition to substituted or unsubstituted catecholate ligands can be present in the complexes described herein. Other ligands that can be present alternatively and/or in combination with catecholate ligands include, for example, amines, diamines, amino alcohols, amino acids, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Where chemically feasible, it is to be recognized that such ligands can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol. Compositions such as glycols having a hydrocarbon backbone can optionally contain one or more double or triple carbon-carbon bonds. Alkanoate includes any of the alpha, beta, and gamma forms of these ligands. Polyamines include, but are not limited to, ethylenediamine, ethylenediamine tetraacetic acid (EDTA), and diethylenetriamine pentaacetic acid (DTPA).

Other examples of ligands that can be present in the complexes of the present disclosure can include monodentate, bidentate, and/or tridentate ligands. Examples of monodentate ligands that can be present in the complexes of the present disclosure include, for example, carbonyl or carbon monoxide, nitride, oxo, hydroxo, water, sulfide, thiols, pyridine, pyrazine, and the like. Examples of bidentate ligands that can be present in the complexes of the present disclosure include, for example, bipyridine, bipyrazine, ethylenediamine, diols (including ethylene glycol), and the like, any of which can contain optional carbon-carbon double or triple bonds. Examples of tridentate ligands that can be present in the complexes of the present disclosure include, for example, terpyridine, diethylenetriamine, triazacyclononane, tris(hydroxymethyl)aminomethane, and the like.

Without being bound by any correctness of theory, it is believed that the intermediate titanium catecholate complexes produced in the methods of the present disclosure are described by Formula 1

$$Ti(L_1)(L_2) \qquad \text{(Formula 1)}$$

wherein $L_1$ and $L_2$ are catecholate ligands and each catecholate ligand is complexed to the titanium (IV) center in a bidentate manner. As such, the titanium (IV) center has a coordination number of 4, thereby rendering it coordinatively unsaturated. In some embodiments, $L_1$ and $L_2$ are the same catecholate ligands. In other embodiments, $L_1$ and $L_2$ are different catecholate ligands.

Referring again to Formula 1, it can be seen that when $L_1$ and $L_2$ are catecholate ligands lacking ionizable functional groups, the intermediate titanium catecholate complex is electrically neutral and bears no counterions. This feature advantageously allows the counterion form to be set definitively upon producing the salt form titanium catecholate complex upon reacting the intermediate titanium catecholate complex with a ligatable compound in the presence of a base.

In alternative embodiments in which $L_1$ and/or $L_2$ bears an ionizable functional group, at least one counterion can be associated with the intermediate titanium catecholate complex. For example, in the case where $L_1$ and/or $L_2$ bears a negatively ionized functional group (e.g., a sulfonic acid or carboxylic acid group), one or more cations can be present to maintain charge balance. In the case where $L_1$ and/or $L_2$ bears a positively ionized functional group (e.g., an ammonium, quaternary ammonium or phosphonium group), one or more anions can be present to maintain charge balance. In the case where $L_1$ and $L_2$ represent two ionized catecholate ligands that bear the same charge (+1 or −1), for example, two counterions (either two cations or two anions) can be associated with the intermediate titanium catecholate complex to maintain charge balance. However, in the case where $L_1$ and $L_2$ represent two ionized catecholate ligands that are different and bear opposite charges, the intermediate titanium catecholate complex can again lack a counterion.

As indicated above, the intermediate titanium catecholate complex can be converted into a salt form titanium catecholate complex through reaction with a ligatable compound in the presence of a base. The base promotes the bonding of an additional ligand to the coordination sphere of the titanium (IV) center and additionally results in generation of a salt form of the titanium (IV) catecholate complex, which is now coordinatively saturated. Bearing the coordination properties of titanium (IV) and catecholate ligands in mind and again not being bound by any correctness of theory, the salt form titanium catecholate complexes of the present disclosure are believed to be defined by Formula 2

$$D_{1-6}Ti(L_1)(L_2)(L_3), \quad \text{(Formula 2)}$$

wherein D is metal cation, ammonium cation, tetraalkylammonium cation, or phosphonium cation, for example, $L_1$ and $L_2$ are defined as above, and $L_3$ is additional ligand. In some embodiments, $L_3$ can also be a catecholate ligand, in which case the salt form titanium catecholate complexes bear only catecholate ligands. In other embodiments, $L_3$ is a non-catecholate ligand. In Formula 2, $L_3$ is a bidentate ligand and bonds with the titanium (IV) center to fill the coordination sphere with six metal-ligand bonds. In alternative embodiments, $L_3$ can represent a monodentate ligand, in which case two molar equivalents of $L_3$ are present to fill the coordination sphere. The molar equivalents of D can range between 1 and 6 depending on whether D is a monovalent or divalent cation, and whether $L_1$-$L_3$ contain any ionizable functional groups. For example, when D is a monovalent cation, such as an alkali metal ion, and $L_1$-$L_3$ are uncharged catecholate ligands, 2 molar equivalents of the monovalent cation are present to maintain charge balance (i.e., the salt form titanium catecholate complexes have a formula of $D_2Ti(L_1)(L_2)(L_3)$). When the base is not an alkali metal base, D can also include any alternative cations (e.g., a single alkaline earth metal ion, a mixture of alkaline earth metal ions, phosphonium ions, ammonium ions, tetralkylammonium ions, and the like), optionally in combination with one or more alkali metal ions, in which case the molar equivalents of D that are present reflect the amount needed to maintain charge balance.

In more specific embodiments, salt form titanium catecholate complexes of the present disclosure can have a structure defined by Formula 3

$$Na_mK_nLi_oTi(L_1)(L_2)(L_3), \quad \text{(Formula 3)}$$

wherein m+n+o=2, provided that $L_1$-$L_3$ do not bear a charged functional group, and $L_1$-$L_3$ are defined as above. For example, in the case of at least one ligand bearing a negatively charged functional group, such as a sulfonic acid anion, greater than two molar equivalents of lithium, sodium and/or potassium ions are needed to maintain charge balance. In more particular embodiments, o=0 and m+n=2, such that the salt form is a sodium and/or potassium salt form. In still more particular embodiments, both m and n are non-zero numbers, and they can be equal or non-equal to one another. In some embodiments, a ratio of m to n can range between about 1:10 to about 10:1, or between about 1:5 or about 5:1. In some embodiments, substantially equal molar quantities of sodium and potassium can be present in the salt form titanium catecholate complexes. Complexes having mixtures of sodium and potassium counterions can be desirable in terms of their potentially increased solubility in aqueous phases. As indicated above, non-catecholate ligands can also be present in such complexes.

The salt form of the titanium catecholate complexes described herein can depend upon the cation associated with the base used to promote formation of the salt form. Suitable bases are not considered to be particularly limited, provided that they have sufficient basicity to produce the salt form titanium catecholate complex. Suitable bases can include, for example, a metal hydroxide, a metal oxide, a metal bicarbonate, a metal carbonate, an ammonium base, a tetraalkylammonium base, a deprotonated ligand base, an amine, a borate, a metal borohydride, a metal hydride, a metal phosphate, a sulfonium base, a phosphazenium base, a guanidinium base, a metal azide, a cyanate base, a thiocyanate base, a metal carboxylate, a phenolate base, a carbamate base, an imide base, a deprotonated sulfonamide base, a nitroxyl base, a basic anion-exchange resin, a metal chalcogenide, a phosphonium base, a tetraalkylphosphonium base, a tetraarylphosphonium base, or any combination thereof. Although some of these bases produce salt form titanium catecholate complexes that are more soluble in an aqueous phase, others may be more beneficial for forming an organic phase containing the titanium catecholate complexes in their salt form.

In some embodiments of the present disclosure, the base can be an alkali metal base or combination of alkali metal bases. In more specific embodiments, the alkali metal base can include an alkali metal hydroxide such as sodium hydroxide, potassium hydroxide, or any combination thereof. In still more particular embodiments, the alkali metal base can be a mixture of sodium hydroxide and potassium hydroxide. The molar ratios of the sodium hydroxide and potassium hydroxide can lie within the counterion ranges disclosed above. Complexes having mixed sodium and potassium counterions can be especially desirable due to their potentially increased solubility values compared to those obtained when only a single alkali metal counterion is present.

In alternative embodiments of the present disclosure, alkali metal bases such as alkali metal oxides, alkali metal carbonates, and alkali metal bicarbonates can be used to promote a reaction with the ligatable compound and convert the intermediate titanium catecholate complex into the corresponding salt form titanium catecholate complex. Optionally, these alkali metal bases can be used in combination with the alkali metal hydroxide bases discussed above. Again, a mixture of sodium and potassium counterions can be introduced through the choice of the alkali metal bases used to produce the salt form titanium catecholate complex. For example, an alkali metal hydroxide having a first alkali metal counterion can be combined with an alkali metal carbonate or bicarbonate having a second alkali metal counterion to accomplish the foregoing.

As still another alternative to alkali metal bases, ammonium bases, such as ammonium hydroxide, can also be used in some embodiments of the present disclosure. In some embodiments, an alkaline aqueous solution can contain a mixture of ammonium hydroxide and an alkali metal base, in which case the resulting salt form titanium catecholate complex can contain a mixture of ammonium and alkali metal counterions. Some ammonium cations can be alkyl substituted, such as tetraalkylammonium cations, and can be suitably incorporated in the salt form titanium catecholate complexes.

In some embodiments, suitable titanium reagents for use in the syntheses disclosed herein can include titanium tetrahalides and titanium oxyhalides. Suitable titanium tetrahalides can include titanium tetrachloride, titanium tetrabromide, titanium tetraiodide, and titanium mixed tetrahalides. As used herein, the term "titanium mixed tetrahalide" refers to a titanium tetrahalide containing two or more different halides, such as $TiCl_3Br$, $TiCl_2Br_2$ and $TiClBr_3$. Titanium tetrafluoride and the related $TiF_6^{2-}$ complex anion are extended polymeric solids and can react with catechol compounds and other ligatable compounds less readily. In addition, titanium tetrafluoride and $TiF_6^{2-}$ generate hydrogen fluoride upon reacting with ligatable compounds, which can be especially problematic to address from a manufacturing standpoint due to the high reactivity and toxicity of this hydrogen halide gas. Titanium tetrachloride can be a particularly desirable titanium reagent for use in the embodiments of the present disclosure, since it can be added as a liquid to the aqueous solution containing the catechol compound.

Suitable titanium oxyhalide reagents can include titanium oxychloride ($TiOCl_2$), titanium oxybromide ($TiOBr_2$) and titanium oxyiodide ($TiOI_2$). The related titanium oxyfluoride compound ($TiOF_2$) can present similar handing and toxicity issues as titanium tetrafluoride. In some embodiments, the titanium oxyhalide can be generated in situ by combining a titanium tetrahalide with water or ice below about 0° C., which can then be combined with the aqueous solution containing the catechol compound.

In still other embodiments, titanium oxysulfate can be a suitable titanium reagent. The byproduct species generated with this titanium reagent is sulfuric acid, which can similarly be retained in the reaction mixture upon formation and isolation of the intermediate titanium catecholate complex. As such, this titanium reagent can be used similarly to titanium tetrahalides and titanium oxyhalides.

Still other suitable titanium reagents can include titanium (IV) alkoxides. Instead of forming a hydrogen halide or sulfuric acid byproduct species, these titanium reagents produce an alcohol as a byproduct species. Although alcohol byproduct species do not present an issue with respect to salt formation, they still can be separated from the intermediate titanium catecholate complexes according to the methods described herein. Specifically, the alcohol byproduct species is also soluble in the reaction mixture and undergoes separation in a like manner to the other byproduct species described above.

In some embodiments, combining the titanium reagent with the aqueous solution can include adding the titanium reagent to the aqueous solution. The aqueous solution can help dissipate the heat produced upon introduction of the titanium reagent thereto. In some embodiments, the titanium reagent can be added at a rate such that the temperature in the reaction mixture rises between about 10° C. to about 20° C. Advantageously, the use of an aqueous solution in the embodiments of the present disclosure can allow the titanium reagent to be added at a faster rate than in analogous processes employing organic solvents, in which a much larger exotherm occurs even with slow addition of the titanium reagent due to its extreme reactivity. When adding the titanium reagent to the catechol compound, the titanium reagent can be added portionwise, continuously, or substantially all at once.

In alternative embodiments of the present disclosure, combining the catechol compound and the titanium reagent can include adding the catechol compound to the titanium reagent.

In some embodiments, the titanium reagent can be combined with the aqueous solution at about room temperature (i.e., 25° C.). In some or other embodiments, the titanium reagent can be combined with the aqueous solution at a temperature ranging between about 20° C. and about 100° C., or between about 30° C. and about 80° C. In still other embodiments, the titanium reagent can be combined with the aqueous solution at a temperature of about 5° C. or above, or about 10° C. or above, or about 15° C. or above, or about 20° C. or above. In some embodiments, the titanium reagent can be added under conditions wherein titanium oxychloride or other titanium oxyhalides are not generated in the aqueous solution upon addition of the titanium reagent.

The reaction between the intermediate titanium catecholate complex and the ligatable compound can similarly be heated, if necessary. Heating to produce the salt form titanium catecholate complex can take place at a temperature of above 25° C. and less than about 50° C., or less than about 75° C., or less than about 100° C., according to some embodiments.

As discussed above, some embodiments of the present disclosure can include isolating the intermediate titanium catecholate complex from the reaction mixture before generating the salt form titanium catecholate complex. Isolation can involve optionally contacting the intermediate titanium catecholate complex with a washing solvent, followed by filtration, centrifugation, decantation, and the like. Isolation of the intermediate titanium catecholate complex can help avert the formation of extraneous salts upon generating the salt form titanium catecholate complex.

In alternative embodiments of the present disclosure, the intermediate titanium catecholate complex is not isolated from the reaction mixture. Non-isolation of the intermediate titanium catecholate complex from the reaction mixture can be desirable, for example, when the production of extraneous salts is acceptable upon generating the salt form titanium catecholate complex.

Accordingly, in some embodiments, methods of the present disclosure can include: providing an aqueous solution containing a catechol compound, adding a titanium reagent to the aqueous solution, and reacting the titanium reagent with the catechol compound in the reaction mixture to form an intermediate titanium catecholate complex containing a 4-coordinate titanium (IV) center and two catecholate ligands. In further embodiments, the methods can include reacting a ligatable compound with the intermediate titanium catehcolate complex in the presence of a base to produce a salt form titanium catecholate complex further containing at least one additional ligand. Suitable catechol compounds, titanium reagents, ligatable compounds, bases and salt forms are set forth in more detail above.

In still further embodiments, the methods can include isolating the intermediate titanium catecholate complex as a solid or slurry before reacting the ligatable compound with the intermediate titanium catecholate complex.

In some other more specific embodiments, methods of the present disclosure can include combining a catechol compound and a titanium reagent in an aqueous solution, in which the titanium reagent is titanium tetrachloride, and reacting the catechol compound with the titanium reagent in the aqueous solution to form a titanium catecholate complex containing one or more catecholate ligands. In some embodiments, the titanium tetrachloride can be added under conditions at which titanium oxychloride is not formed in the aqueous solution. In further embodiments, the titanium catecholate complex can be further reacted with one or more additional ligatable compounds, such as under alkaline conditions.

As mentioned above, the present disclosure can also be generalized to include aqueous methods for forming titanium complexes of hydroxybenzene compounds, including monohydroxybenzene compounds, and substituted or unsubstituted polyhydroxybenzene compounds as mentioned above. Accordingly, in some embodiments, methods of the present disclosure can include providing an aqueous solution containing a hydroxybenzene compound, combining a titanium reagent with the aqueous solution to form a reaction mixture, and isolating a titanium coordination complex from the reaction mixture as a solid or slurry, in which the titanium coordination complex contains at least one hydroxybenzene compound. Any combination of additional ligatable compounds can be further reacted with the initially produced titanium coordination complex to form a titanium coordination complex containing at least one addition ligand. The ligatable compound can be reacted with the initially produced titanium coordination complex in solution, as a slurry, or as a melt. Accordingly, in some or other embodiments, methods of the present disclosure can include providing a titanium coordination complex containing at least one hydroxybenzene ligand, and contacting a slurry or melt of the titanium coordination complex with a slurry or melt of a ligatable compound to produce a titanium coordination complex containing at least one hydroxybenzene ligand and at least one additional ligand.

In some or other various embodiments, the present disclosure provides compositions containing salt form titanium catecholate complexes. In more specific embodiments, the compositions described herein include a salt form titanium catecholate complex containing two catecholate ligands and at least one additional ligand, such as an alkali metal salt form. In addition, the compositions can be free or substantially free of organic solvents and also free or substantially free of extraneous salt not associated with the salt form titanium catecholate complex. In more specific embodiments, the compositions are free of organic solvents and contain about 0.01 molar equivalents or less of extraneous salts relative to the salt form titanium catecholate complex.

In further embodiments, the compositions can contain an aqueous phase, in which the salt form titanium catecholate complex is present. In more specific embodiments, the aqueous phase can be substantially free of alkali metal halide salts when the salt form titanium catecholate complex is an alkali metal salt form. As discussed above, the synthetic processes described hereinabove allow compositions of this type to be readily prepared.

In various embodiments, aqueous phases containing the salt form titanium catecholate complexes of the present disclosure can have a concentration of the complex of about 0.5 M or above. In more particular embodiments, the concentration of the salt form titanium catecholate complex can range between about 0.5 M and about 2 M, or between about 0.75 M and about 1.5 M or between about 1 M and about 2 M.

In some embodiments, the aqueous phase can be free of organic solvents and consist of water alone as a solvent for the salt form titanium catecholate complex. In other embodiments of the present disclosure, the aqueous phase can contain at least about 98% water by weight. In other more specific embodiments, the aqueous phase can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight.

In further embodiments, the aqueous phase can include a viscosity modifier, a wetting agent, a buffer, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, the aqueous phase can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Illustrative buffers that can be present include, but are not limited to, salts of phosphates, borates, carbonates, silicates, tris(hydroxymethyl)aminomethane (TRIS), 4-(2-hydroxyethyl)-1-piperazineethanesulfonic acid (HEPES), piperazine-N,N'-bis(ethanesulfonic acid) (PIPES), or any combination thereof inclusion of any of these components in the aqueous phase can help maintain the salt form titanium catecholate complex in a dissolved form and/or facilitate the incorporation of the aqueous phase in a flow battery, for example.

In some embodiments, the aqueous phases described herein can further include one or more mobile ions (i.e., an extraneous electrolyte) for use as an electrolyte solution in a flow battery or similar electrochemical system. In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g, $Li^+$, $Na^+$, $K^+$, $Mg^{2+}$, $Ca^+$ and $Sr^{2+}$) and halides (e.g., $F^-$, $Cl^-$, or $Br^-$). Other suitable mobile ions can include, for example, ammonium and tetraalkylammonium ions, chalcogenides, phosphate, hydrogen phosphate, phosphonate, nitrate, sulfate, nitrite, sulfite, perchlorate, tetrafluoroborate, hexafluorophosphate, and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide. In other various embodiments, aqueous phases containing the salt form titanium catecholate complexes of the present disclosure can lack an extraneous electrolyte altogether.

As indicated above, the salt form titanium catecholate complexes of the present disclosure, particularly alkali metal salt form titanium catecholate complexes, and related aqueous phases containing these complexes can be incorporated in flow batteries and other electrochemical systems. Further disclosure on suitable flow batteries and their operating parameters follows hereinafter.

In various embodiments, flow batteries of the present disclosure can include a first half-cell containing a first electrolyte solution therein, in which the first electrolyte solution constitutes a salt form titanium catecholate complex of the present disclosure in an aqueous phase. More specific discussion regarding the salt form titanium catecholate complexes and their associated compositions is provided above.

In further embodiments, flow batteries of the present disclosure can also include a second half-cell having a second electrolyte solution therein, where the second electrolyte solution contains an active material differing from that in the first electrolyte solution. In more specific embodiments, the second electrolyte solution can be an aqueous solution containing an iron hexacyanide complex. Iron hexacyanide complexes can be particularly desirable active materials due to their facile electrode kinetics and substantially reversible electrochemical behavior within the working electrochemical window of aqueous solutions. Organic compounds including nitroxide compounds (particularly [2,2,6,6-tetramethyl-4-(sulfooxy)piperidin-1-yl]oxidanyl) or salt, or a pyrroline, pyrrolidine, imidazoline, imidazolidine, oxazoline, oxazolidine, thiazoline, thioazolidine, and their benzo-fused analogues, and derivatives thereof can be similarly advantageous active materials for the second electrolyte solution in some embodiments. Hence, these substances can allow high open circuit potentials and cell efficiencies to be realized, particularly in combination with a salt form titanium catecholate complex as the active material in the first electrolyte solution. In more specific embodiments, flow batteries of the present disclosure can include the first electrolyte solution in contact with a negative electrode of the flow battery and the second electrolyte solution in contact with the positive electrode of the flow battery.

Illustrative flow battery configurations will now be described in further detail. The flow batteries of the present disclosure are, in some embodiments, suited to sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like, and any combination thereof. Further, while the disclosure herein is generally directed to flow batteries, it is to be appreciated that other electrochemical energy storage media can incorporate the aqueous phases described herein, specifically those utilizing stationary electrolyte solutions.

In some embodiments, flow batteries of the present disclosure can include: a first chamber containing a negative electrode contacting a first aqueous electrolyte solution; a second chamber containing a positive electrode contacting a second aqueous electrolyte solution, and a separator disposed between the first and second electrolyte solutions. The first aqueous electrolyte solution can be an aqueous phase containing a salt form titanium catecholate complex defining a composition of the present disclosure, as described above. The chambers provide separate reservoirs within the cell, through which the first and/or second electrolyte solutions circulate so as to contact the respective electrodes and the separator. Each chamber and its associated electrode and electrolyte solution define a corresponding half-cell. The separator provides several functions which include, for example, (1) serving as a barrier to mixing of the first and second electrolyte solutions, (2) electrically insulating to reduce or prevent short circuits between the positive and negative electrodes, and (3) to facilitate ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, electrolyte solutions can be transported from separate storage tanks through the corresponding chambers. In a charging cycle, electrical power can be applied to the cell such that the active material contained in the second electrolyte solution undergoes a one or more electron oxidation and the active material in the first electrolyte solution undergoes a one or more electron reduction. Similarly, in a discharge cycle the second active material is reduced and the first active material is oxidized to generate electrical power.

In more specific embodiments, illustrative flow batteries of the present disclosure can include: (a) a first aqueous electrolyte solution containing a first coordination complex; (b) a second aqueous electrolyte solution containing a second coordination complex or organic compound; (c) a separator positioned between said first and second aqueous electrolyte solutions; and (d) an optional mobile ion in the first and second aqueous electrolyte solutions. As described in more detail below, the separator can be an ionomer membrane, and it can have a thickness of less than 100 microns and have an associated net charge that is the same sign as that of the first and second coordination complexes.

FIG. 1 depicts a schematic of an illustrative flow battery containing a single electrochemical cell. Although FIG. 1 shows a flow battery containing a single electrochemical cell, approaches for combining multiple electrochemical cells together are known and are discussed in brief hereinbelow. Unlike typical battery technologies (e.g., Li-ion, Ni-metal hydride, lead-acid, and the like), where active materials and other components are housed in a single assembly, flow batteries transport (e.g., via pumping) redox-active energy storage materials from storage tanks through an electrochemical stack. This design feature decouples the electrical energy storage system power from the energy storage capacity, thereby allowing for considerable design flexibility and cost optimization.

As shown in FIG. 1, flow battery 1 includes an electrochemical cell that features separator 20 (e.g., a membrane) that separates the two electrodes 10 and 10' of the electrochemical cell. As used herein, the terms "separator" and "membrane" synonymously refer to an ionically conductive and electrically insulating material disposed between the positive and negative electrodes of an electrochemical cell. Electrodes 10 and 10' are formed from a suitably conductive material, such as a metal, carbon, graphite, and the like. Although FIG. 1 has shown electrodes 10 and 10' as being spaced apart from separator 20, electrodes 10 and 10' can also be abutted with separator 20 in more particular embodiments. The material(s) forming electrodes 10 and 10' can be porous, such that they have a high surface area for contacting first electrolyte solution 30 and second electrolyte solution 40, the active materials of which are capable of cycling between an oxidized state and a reduced state during operation of flow battery 1. For example, one or both of electrodes 10 and 10' can be formed from a porous carbon cloth or a carbon foam in particular embodiments.

Pump 60 affects transport of first electrolyte solution 30 containing a first active material from tank 50 to the electrochemical cell. The flow battery also suitably includes second tank 50' that holds second electrolyte solution 40 containing a second active material. The second active material in second electrolyte solution 40 can be the same material as the first active material in first electrolyte solution 30, or it can be different. Second pump 60' can affect transport of second electrolyte solution 40 to the electrochemical cell. Pumps (not shown in FIG. 1) can also be used to affect transport of the first and second electrolyte solutions 30 and 40 from the electrochemical cell back to tanks 50 and 50', Other methods of affecting fluid transport, such as siphons, for example, can also suitably transport first and second electrolyte solutions 30 and 40 into and out of the electrochemical cell. Also shown in FIG. 1 is power source or load 70, which completes the circuit of the electrochemical cell and allows a user to collect or store electricity during its operation. Connection to the electrical grid for charging or discharging purposes can also occur at this location.

It should be understood that FIG. 1 depicts a specific, non-limiting embodiment of a flow battery. Accordingly, flow batteries consistent with the spirit of the present disclosure can differ in various aspects relative to the configuration of FIG. 1. As one example, a flow battery system can include one or more active materials that are solids, gases, and/or gases dissolved in liquids. Active materials can be stored in a tank, in a vessel open to the atmosphere, or simply vented to the atmosphere.

During operation of a flow battery in a charging cycle, one of the active materials undergoes oxidation and the other active material undergoes reduction. In a discharging cycle, the opposite processes occur in each half-cell. Upon changing the oxidation states of the active materials, the chemical potentials of the electrolyte solutions are no longer in balance with one another. To relieve the chemical potential imbalance, dissolved mobile ions migrate through the separator to lower the charge in one electrolyte solution and to raise the charge in the other electrolyte solution. Thus, the mobile ions transfer the charge generated upon oxidizing or reducing the active materials, but the mobile ions themselves are not usually oxidized or reduced. To maintain facile electrode kinetics, the flow batteries are configured such that the mobile ions and the active materials remain continuously dissolved in the electrolyte solutions. In addition, by keeping the mobile ions and the active materials continuously dissolved in the electrolyte solutions, potential issues associated with circulating solids can be averted.

As indicated above, multiple electrochemical cells can also be combined with one another in an electrochemical stack in order to increase the rate that energy can be stored and released during operation. The amount of energy released is determined by the overall amount of active materials that are present. An electrochemical stack utilizes bipolar plates between adjacent electrochemical cells to establish electrical communication but not fluid communication between the two cells across the bipolar plate. Thus, bipolar plates contain the electrolyte solutions in an appropriate half-cell within the individual electrochemical cells. Bipolar plates are generally fabricated from electrically conductive materials that are fluidically non-conductive on the whole. Suitable materials can include carbon, graphite, metal, or a combination thereof. Bipolar plates can also be fabricated from non-conducting polymers having a conductive material dispersed therein, such as carbon particles or fibers, metal particles or fibers, graphene, and/or carbon nanotubes. Although bipolar plates can be fabricated from the same types of conductive materials as can the electrodes of an electrochemical cell, they can lack the continuous porosity permitting an electrolyte solution to flow completely through the latter. It should be recognized that bipolar plates are not necessarily entirely non-porous entities, however. Bipolar plates can have innate or designed flow channels that provide a greater surface area for allowing an electrolyte solution to contact the bipolar plate. Suitable flow channel configurations can include, for example, interdigitated flow channels. In some embodiments, the flow channels can be used to promote delivery of an electrolyte solution to an electrode within the electrochemical cell.

In some instances, an electrolyte solution can be delivered to and withdrawn from each electrochemical cell via a fluid inlet manifold and a fluid outlet manifold (not shown in FIG. 1). In some embodiments, the fluid inlet manifold and the fluid outlet manifold can provide and withdraw an electrolyte solution via the bipolar plates separating adjacent electrochemical cells. Separate manifolds can provide each electrolyte solution individually to the two half-cells of each electrochemical cell. In more particular embodiments, the fluid inlet manifold and the fluid outlet manifold can be configured to supply and withdraw the electrolyte solutions via opposing lateral faces of the bipolar plates (e.g. by supplying and withdrawing the electrolyte solution from opposing ends of the flow channels of the bipolar plate).

As used herein, the terms "separator" and "membrane" refer to an ionically conductive and electrically insulating material disposed between the positive and negative electrodes of an electrochemical cell. The separator can be a porous membrane in some embodiments and/or an ionomer membrane in other various embodiments. In some embodiments, the separator can be formed from an conically conductive polymer.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—CF=$CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and poly ethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, polyvinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of chemicals (e.g., active materials) passing through the separator from one electrode to another and causing cross-contamination and/or reduction in cell energy efficiency. The degree of this cross-contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries of the present disclosure can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 mA/cm$^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm$^2$. In further embodiments, suitable separators can include those in which the flow battery is capable of operating at a voltage efficiency of greater than 70%, greater than 80% or even greater than 90%.

The diffusion rate of the first and second active materials through the separator can be less than about $1 \times 10^{-5}$ mol cm$^{-2}$ day$^{-1}$, or less than about $1 \times 10^6$ mol cm$^{-2}$ day$^{-1}$, or less than about $1 \times 10^{-7}$ mol cm$^{-2}$ day$^{-1}$, or less than about $1 \times 10^{-9}$ mol cm$^{-2}$ day$^{-1}$, or less than about $1 \times 10^{-11}$ mol cm$^{-2}$ day$^{-1}$, or less than about $1 \times 10^{-13}$ mol cm$^{-2}$ day$^{-1}$, or less than about $1 \times 10^{-15}$ mol cm$^{-2}$ day$^{-1}$.

The flow batteries can also include an external electrical circuit in electrical communication with the first and second electrodes. The circuit can charge and discharge the flow battery during operation. Reference to the sign of the net ionic charge of the first, second, or both active materials relates to the sign of the net ionic charge in both oxidized and reduced forms of the redox active materials under the conditions of the operating flow battery. Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). In some embodiments, the net ionic charge in both the oxidized and reduced forms can be negative. The matching charges of the first and/or second active materials and the ionomer membrane can provide a high selectivity. More specifically, charge matching can provide less than about 3%, less than about 20/%, less than about 1%, less than about 0.5%, less than about 0.2%, or less than about 0.1% of the molar flux of ions passing through the ionomer membrane as being attributable to the first or second active material. The term "molar flux of ions" refers to the amount of ions passing through the ionomer membrane, balancing the charge associated with the flow of external electricity/electrons. That is, the flow battery is capable of operating or operates with the substantial exclusion of the active materials by the ionomer membrane, and such exclusion can be promoted through charge matching.

Flow batteries incorporating the electrolyte solutions of the present disclosure can have one or more of the following operating characteristics: (a) where, during the operation of the flow battery, the first or second active materials comprise less than about 3% of the molar flux of ions passing through the ionomer membrane; (b) where the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane; (e) where the ionomer membrane has a thickness of less than about 100 µm, less than about 75 µm, less than about 50 µm, or less than about 250 µm; (f) where the flow battery is capable of operating at a current density of greater than about 100 mA/cm² with a round trip voltage efficiency of greater than about 60%, and (g) where the energy density of the electrolyte solutions is greater than about 10 Wh/L, greater than about 20 Wh/L, or greater than about 30 Wh/L.

In some cases, a user may desire to provide higher charge or discharge voltages than available from a single battery cell. In such cases, several battery cells can be connected in series such that the voltage of each cell is additive. This forms a bipolar stack. An electrically conductive, but non-porous material (e.g., a bipolar plate) can be employed to connect adjacent battery cells in a bipolar stack, which allows for electron transport but prevents fluid or gas transport between adjacent cells. The positive electrode compartments and negative electrode compartments of individual cells can be fluidically connected via common positive and negative fluid manifolds in the stack. In this way, individual cells can be stacked in series to yield a voltage appropriate for DC applications or conversion to AC applications.

In additional embodiments, the cells, cell stacks, or batteries can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the respective chambers and storage tanks for holding charged and discharged electrolytes. The cells, cell stacks, and batteries of this disclosure can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack); storage tanks and piping for containing and transporting the electrolyte solutions; control hardware and software (which may include safety systems); and a power conditioning unit. The flow battery cell stack accomplishes the conversion of charging and discharging cycles and determines the peak power. The storage tanks contain the positive and negative active materials, such as the coordination complexes disclosed herein, and the tank volume determines the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming AC electricity into DC electricity at an appropriate voltage and current for the cell stack. In a discharging cycle, the stack produces DC electrical power and the power conditioning unit converts it to AC electrical power at the appropriate voltage and frequency for grid applications.

Where not otherwise defined hereinabove or understood by one having ordinary skill in the art, the definitions in the following paragraphs will be applicable to the present disclosure.

As used herein, the term "energy density" refers to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad \text{(Equation 1)}$$

where OCV is the open circuit potential at 50% state of charge, (26.8 A-h/mol) is Faraday's constant, and $[e^-]$ is the concentration of electrons stored in the active material at 99% state of charge. In the case that the active materials largely are an atomic or molecular species for both the positive and negative electrolyte, $[e^-]$ can be calculated by Equation 2 as:

$$[e^-] = [\text{active materials}] \times N/2 \quad \text{(Equation 2)}$$

where [active materials] is the molar concentration of the active material in either the negative or positive electrolyte, whichever is lower, and N is the number of electrons transferred per molecule of active material. The related term "charge density" refers to the total amount of charge that each electrolyte contains. For a given electrolyte, the charge density can be calculated by Equation 3

$$\text{Charge density} = (26.8 \text{ A-h/mol}) \times [\text{active material}] \times N \quad \text{(Equation 3)}$$

where [active material] and N are as defined above.

As used herein, the term "current density" refers to the total current passed in an electrochemical cell divided by the geometric area of the electrodes of the cell and is commonly reported in units of mA/cm².

As used herein, the term "current efficiency" ($I_{eff}$) can be described as the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" can be described as the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,rt}$) at a given current density can be calculated from the cell voltage at discharge ($V_{discharge}$) and the voltage at charge ($V_{charge}$) using equation 4:

$$V_{eff,RT} = V_{discharge}/V_{charge} \times 100\%$$ (Equation 4)

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

EXAMPLES

Figure 2:
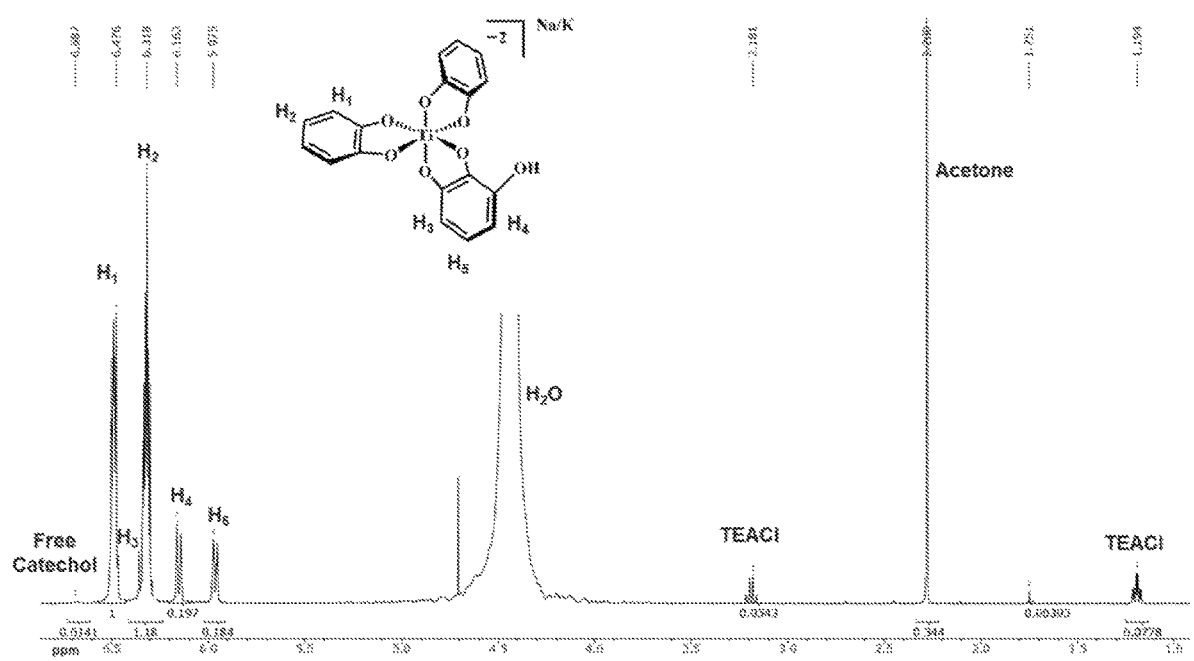
FIGS. 2 and 3 show illustrative $^1$H and $^{13}$C NMR spectra of a titanium catecholate complex produced under aqueous conditions.
Figure 3:
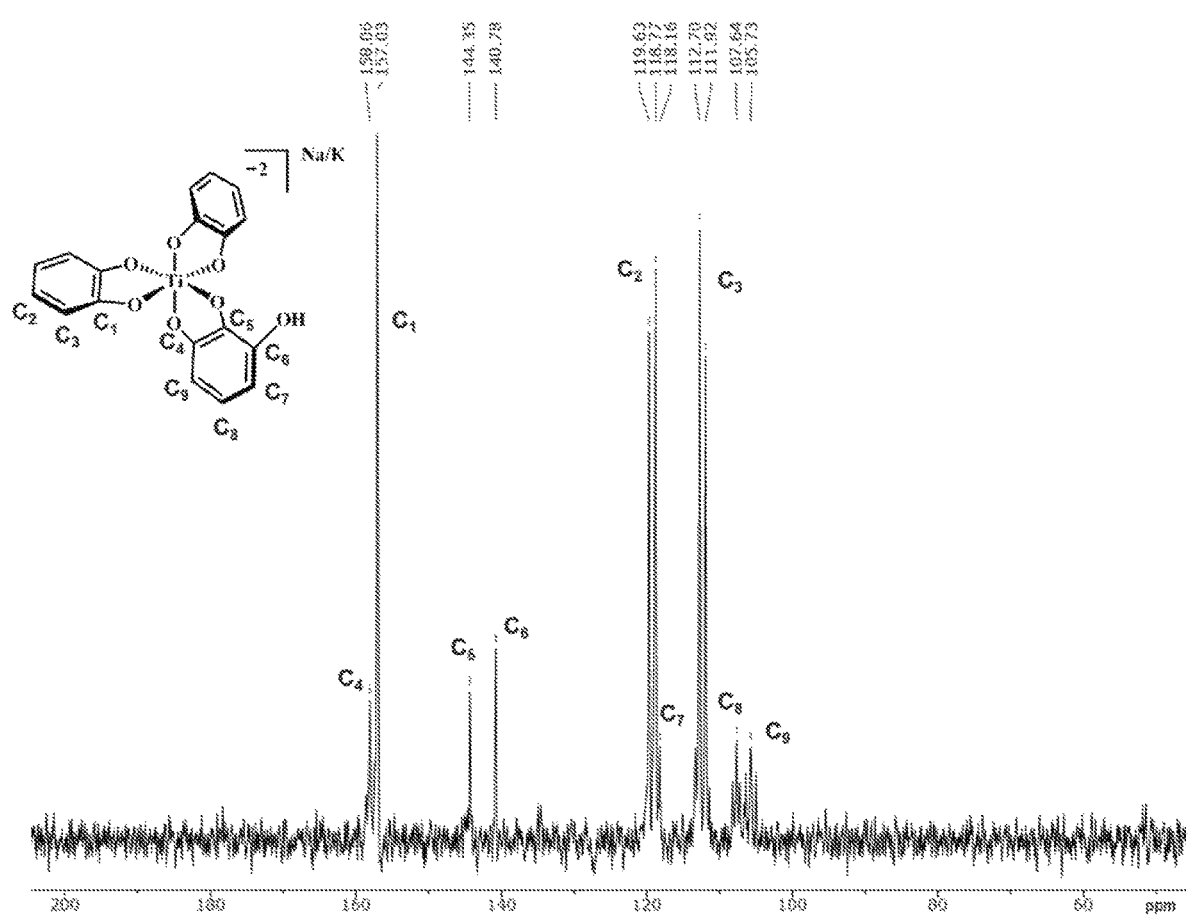

A titanium catecholate complex was prepared by adding titanium tetrachloride to an aqueous catechol solution. Gallol was combined thereafter in the presence of an aqueous base. The $^1H$ and $^{13}C$ NMR spectra were consistent with complex formation. FIGS. 2 and 3 show illustrative $^1H$ and $^{13}C$ NMR spectra in acetone-$d_6$ of a titanium catecholate complex formed under aqueous conditions. Tetraethylammonium chloride (TEACl) was included as an internal standard.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A method comprising:
   (a) combining a titanium reagent with a catechol compound in an aqueous solution to form an intermediate titanium catecholate complex;
   (b) isolating the intermediate titanium catecholate complex as a solid or slurry from the aqueous solution; and
   (c) combining the intermediate titanium catecholate complex in the presence of a base with a compound capable of coordinating as a bidentate ligand to titanium to produce a salt form titanium catecholate complex that further comprises the compound, or a salt form thereof, coordinated to the titanium as a bidentate ligand.

2. The method of claim 1, wherein the salt form titanium catecholate complex is produced in an aqueous phase.

3. The method of claim 1, wherein the base is present in an alkaline aqueous solution.

4. The method of claim 1, wherein the base comprises one or more alkali metal bases.

5. The method of claim 1, wherein the compound capable of coordination as a bidentate ligand to titanium is a catechol and the salt form titanium catecholate complex comprises only catecholate ligands.

6. The method of claim 1, wherein the intermediate titanium catecholate complex comprises a 4-coordinate titanium (IV) center and two catecholate ligands.

7. The method of claim 1, wherein the titanium reagent is combined with the aqueous solution at a temperature between about 20° C. and about 100° C.

8. The method of claim 1, wherein the titanium reagent comprises titanium tetrachloride.

9. The method of claim 1, wherein the compound capable of coordinating as a bidentate ligand to titanium is pyrogallol or a monosulfonated catechol.

10. The method of claim 1, wherein the titanium reagent comprises a titanium tetrahalide or oxyhalide.

11. The method of claim 1, wherein the catechol compound and the compound capable of coordinating as a bidentate ligand are different compounds.

12. The method of claim 1, wherein the catechol compound comprises unsubstituted catechol and the compound capable of coordinating as a bidentate ligand is a monosulfonated catechol or pyrogallol.

13. The method of claim 1, wherein the salt form titanium catecholate complex comprises two catecholate ligands and one additional bidentate, non-catecholate ligand.

14. A method comprising:
   combining a titanium reagent with an aqueous solution comprising a catechol compound; wherein a reaction between the titanium reagent with the catechol compound results in the formation of an isolable intermediate titanium catecholate complex comprising a 4-coordinate titanium (IV) center and two catecholate ligands; and then
   contacting the intermediate titanium catecholate complex with a compound capable of coordinating as a bidentate ligand to titanium in the presence of a base, wherein the contacting allows a reaction that results in the formation of a salt form titanium catecholate complex that further comprises the compound, or a salt form thereof, coordinated to the titanium as a bidentate ligand.

15. The method of claim 14, wherein the compound capable of coordination as a bidentate ligand to titanium is a catechol and the salt form titanium catecholate complex comprises only catecholate ligands.

16. The method of claim 14, wherein the salt form titanium catecholate complex is produced in an aqueous phase.

17. The method of claim 16, wherein the base is present in an alkaline aqueous solution.

18. The method of claim 14, further comprising:
   isolating the intermediate titanium catecholate complex as a solid or slurry before reacting the compound capable of coordinating as a bidentate ligand to titanium.

19. The method of claim 14, wherein the titanium reagent is added to the aqueous solution at a temperature between about 20° C. and about 100° C.

20. The method of claim 14, wherein the titanium reagent comprises titanium tetrachloride.

21. The method of claim 14, wherein the titanium reagent comprises a titanium tetrahalide or oxyhalide.

22. The method of claim 14, wherein the catechol compound comprises an unsubstituted catechol, a monosulfonated catechol, or pyrogallol.

23. The method of claim 14, wherein the compound capable of coordinating as a bidentate ligand to titanium and the catechol acting as a ligand on the intermediate titanium catecholate complex are different compounds.

* * * * *

UNITED STATES PATENT AND TRADEMARK OFFICE
CERTIFICATE OF CORRECTION

PATENT NO. : 10,741,864 B2
APPLICATION NO. : 15/473553
DATED : August 11, 2020
INVENTOR(S) : Steven Reece et al.

Page 1 of 3

It is certified that error appears in the above-identified patent and that said Letters Patent is hereby corrected as shown below:

On the Title Page

Item [56], References Cited, under heading OTHER PUBLICATIONS:

Page 3, Column 2, Lines 13-15:
Replace "Borgias, "Synthetic, structural, and physical studies of titanium complexes of catechol and 3, 5-di-tert-butylcatechol," Inorg. Chem., Apr. 1984, 23(8), 1009-1016."
With --Borgias et al., "Synthetic, structural, and physical studies of titanium complexes of catechol and 3, 5-di-tert-butylcatechol," Inorg. Chem., Apr. 1984, 23(8), 1009-1016.--

Column 2, Lines 34-36:
Replace "Davies, "Eiectroceramics from Source Materials via Molecular Intermediates: PbTi03 from Ti02 via [Ti(catecholate)3]2-," J. Am. Ceram. Soc., Aug. 1990, 73(8), 2570-2572."
With --Davies et al., "Electroceramics from Source Materials via Molecular Intermediates: $PbTiO_3$ from $TiO_2$ via $[Ti(catecholate)_3]^{2-}$," J. Am. Ceram. Soc., Aug. 1990, 73(8), 2570-2572.--

Column 2, Lines 37-39:
Replace "Davies, "Electroceramics from Source Materials via Molecular Intermediates: BaTI03 from TI02 via [TI(catecholate)3]2-," May 1990, J. Am. Ceram. Soc., Aug. 1990, 73(5), 1429-30."
With --Davies et al., "Electroceramics from Source Materials via Molecular Intermediates: $BaTiO_3$ from $TiO_2$ via $[Ti(catecholate)_3]^{2-}$," May 1990, J. Am. Ceram. Soc., Aug. 1990, 73(5), 1429-30.--

Column 2, Lines 51-52:
Replace "Kim, "Novel catalytic effects of Mn304 for all vanadium redox flow batteries," Chem. Commun., Apr. 2012, 48(44), 5455-5457."
With --Kim et al., "Novel catalytic effects of $Mn_3O_4$ for all vanadium redox flow batteries," Chem. Commun., Apr. 2012, 48(44), 5455-5457.--

Signed and Sealed this
Eighth Day of December, 2020

Andrei Iancu
*Director of the United States Patent and Trademark Office*

CERTIFICATE OF CORRECTION (continued)
U.S. Pat. No. 10,741,864 B2

Column 2, Lines 53-56:
Replace "Kulesza, "Electrochemical preparation and characterization of hybrid films composed of Prussian blue type metal hexacyanoferrate and conducting polymer," Electrochimica Acta, Aug. 2001, 46(26-27), 4065-4073."
With --Kulesza et al., "Electrochemical preparation and characterization of hybrid films composed of Prussian blue type metal hexacyanoferrate and conducting polymer," Electrochimica Acta, Aug. 2001, 46(26-27), 4065-4073.--

Page 4, Column 1, Lines 12-14:
Replace "Modiba, "Electrochemical impedance spectroscopy study of Ce(IV) with aminopolycarboxylate ligands for redox flow batteries applications," Journal of Power Sources, May 2012, vol. 205, 1-9."
With --Modiba et al., "Electrochemical impedance spectroscopy study of Ce (IV) with aminopolycarboxylate ligands for redox flow batteries applications," Journal of Power Sources, May 2012, vol. 205, 1-9.--

Column 1, Lines 31-36:
Replace "Raymond, "Coordination isomers of biological iron transport compounds. VI. Models of the enterobactin coordination site. A crystal field effect in the structure of potassium tris (catecholato) chromate(III) and -ferrate(III) sesq u ihyd rates, K3[M( 02C6H4 )3]. 1 . 5H20, M~chromium, iron," J. Am. Chem. Soc., Mar. 1976, 98(7), 1767-1774."
With --Raymond et al., "Coordination isomers of biological iron transport compounds. VI. Models of the enterobactin coordination site. A crystal field effect in the structure of potassium tris(catecholato)chromate(III) and -ferrate(III) sesquihydrates, $K_3(M(O_2C6H_4)_3)$-$_{1.5}H_2O$, M = Cr, $Fe_1$," J. Am. Chem. Soc., Mar. 1976, 98(7), 1767-1774.--

Column 1, Lines 37-39:
Replace "Saito et al. "DPPH radical-scavenging reaction of protocatechuic acid: differnce in reactivity between acids and their esters," Helv Chim Acta, 2006, pp. 1395-1407, vol. 89."
With --Saito et al. "DPPH radical-scavenging reaction of protocatechuic acid: difference in reactivity between acids and their esters," Helv Chim Acta, 2006, pp. 1395-1407, vol. 89.--

Column 2, Lines 1-5:
Replace "Sommer, "Titanium (IV) complexes with ligands having oxygen donor atoms in aqueous solutions," Zeitschrift fur Anorganische and Aligemeine Chemie, Mar. 1963, pp. 191-197, vol. 321, issue 3-4. Spyroudis, "Hydroxyquinones: Synthesis and Reactivity," Molecules, 2000, pp. 1291-1330, 5."
With --Sommer, "Titanium (IV) complexes with ligands having oxygen donor atoms in aqueous solutions," Zeitschrift für Anorganische und Aligemeine Chemie, Mar. 1963, pp. 191-197, vol. 321, issue 3-4. Spyroudis, "Hydroxyquinones: Synthesis and Reactivity," Molecules, 2000, pp. 1291-1330, 5.--

Column 2, Lines 6-8:
Replace "Steenken, "One-electron redox potentials of phenols. Hydroxy- and aminophenols and related compounds of biological interest," J. Phys. Chem., Sep. 1982, 86(18), 3661-3667."

CERTIFICATE OF CORRECTION (continued)
U.S. Pat. No. 10,741,864 B2

With --Steenken et al., "One-electron redox potentials of phenols. Hydroxy- and aminophenols and related compounds of biological interest," J. Phys. Chem., Sep. 1982, 86(18), 3661-3667.--

Column 2, Lines 9-12:
Replace "Torres-Gomez, "Energy Storage in Hybrid Organic-Inorganic Materials Hexacyanoferrate-Doped Polypyrrole as Cathode in Reversible Lithium Cells," J. of the Electrochemical Society, 2000, 147(7), 2513-2516."
With --Torres-Gómez et al., "Energy Storage in Hybrid Organic-Inorganic Materials Hexacyanoferrate-Doped Polypyrrole as Cathode in Reversible Lithium Cells," J. of the Electrochemical Society, 2000, 147(7), 2513-2516.--